United States Patent
Yang et al.

(10) Patent No.: US 11,805,394 B2
(45) Date of Patent: *Oct. 31, 2023

(54) CONTEXT MANAGEMENT METHOD AND APPARATUS

(71) Applicant: HUAWEI TECHNOLOGIES CO., LTD., Guangdong (CN)

(72) Inventors: Yanmei Yang, Beijing (CN); Manli Sun, Shenzhen (CN); Zhenglei Huang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,457

(22) Filed: Aug. 17, 2022

(65) Prior Publication Data

US 2022/0408227 A1 Dec. 22, 2022

Related U.S. Application Data

(63) Continuation of application No. 16/953,953, filed on Nov. 20, 2020, now Pat. No. 11,457,334, which is a continuation of application No. PCT/CN2019/085731, filed on May 6, 2019.

(30) Foreign Application Priority Data

May 21, 2018 (CN) .......................... 201810490361.7

(51) Int. Cl.
H04W 8/18 (2009.01)
H04W 4/08 (2009.01)

(52) U.S. Cl.
CPC ............. *H04W 4/08* (2013.01); *H04W 8/186* (2013.01)

(58) Field of Classification Search
CPC ....... H04W 4/08; H04W 8/186; H04W 12/76; H04W 4/70; H04W 12/72; H04W 12/06; H04W 12/08; H04W 28/0967; H04W 28/16; H04W 64/00; H04B 7/18545
See application file for complete search history.

(56) References Cited

U.S. PATENT DOCUMENTS

| | | | |
|---|---|---|---|
| 10,659,940 B2 | 5/2020 | Wang et al. | |
| 11,316,902 B2 | 4/2022 | Andrews et al. | |
| 11,457,334 B2 * | 9/2022 | Yang ..................... | H04W 12/76 |
| 2006/0212924 A1 | 9/2006 | Xie et al. | |
| 2012/0134297 A1 | 5/2012 | Sakamoto | |

(Continued)

FOREIGN PATENT DOCUMENTS

| | | |
|---|---|---|
| CN | 101217382 A | 7/2008 |
| CN | 102014343 A | 4/2011 |

(Continued)

*Primary Examiner* — Andrew Wendell
(74) *Attorney, Agent, or Firm* — WOMBLE BOND DICKINSON (US) LLP

(57) ABSTRACT

This application provides a context management method and apparatus, to resolve a problem that contexts of a large quantity of terminals occupy a large amount of storage space of an AMF entity. The method includes: when a first core network device has stored group information corresponding to a terminal, establishing, by the first core network device, a correspondence between the terminal and the group information. This application relates to the field of communications technologies.

20 Claims, 11 Drawing Sheets

(56) References Cited

U.S. PATENT DOCUMENTS

| | | |
|---|---|---|
| 2012/0287854 A1 | 11/2012 | Xie et al. |
| 2013/0021972 A1 | 1/2013 | Lim et al. |
| 2013/0044646 A1 | 2/2013 | Qu et al. |
| 2013/0051361 A1 | 2/2013 | Yokoyama |
| 2014/0307647 A1 | 10/2014 | Yang |
| 2017/0208095 A1 | 7/2017 | Wei et al. |

FOREIGN PATENT DOCUMENTS

| | | | |
|---|---|---|---|
| CN | 102238510 | A | 11/2011 |
| CN | 102238512 | A | 11/2011 |
| CN | 102685715 | A | 9/2012 |
| CN | 102958002 | A | 3/2013 |
| CN | 103120004 | A | 5/2013 |
| CN | 103188738 | A | 7/2013 |
| CN | 104641667 | A | 5/2015 |
| CN | 106550349 | A | 3/2017 |
| CN | 107466067 | A | 12/2017 |
| CN | 107995603 | A | 5/2018 |

\* cited by examiner

When a first core network device has stored group
information corresponding to a terminal, the first core
network device establishes a correspondence between the
terminal and the group information                       ／ 401

FIG. 4

When a first core network device does not store group
information corresponding to a terminal, the first core
network device obtains the group information            ／ 501

The first core network device creates a group context based
on the group information, where the group context includes
the group information                                    ／ 502

FIG. 5

A first core network device obtains group access
information based on group policy information and group
subscription information                                 ／ 601

The first core network device creates a group context based
on the group access information, where the group context
includes the group access information                    ／ 602

FIG. 6

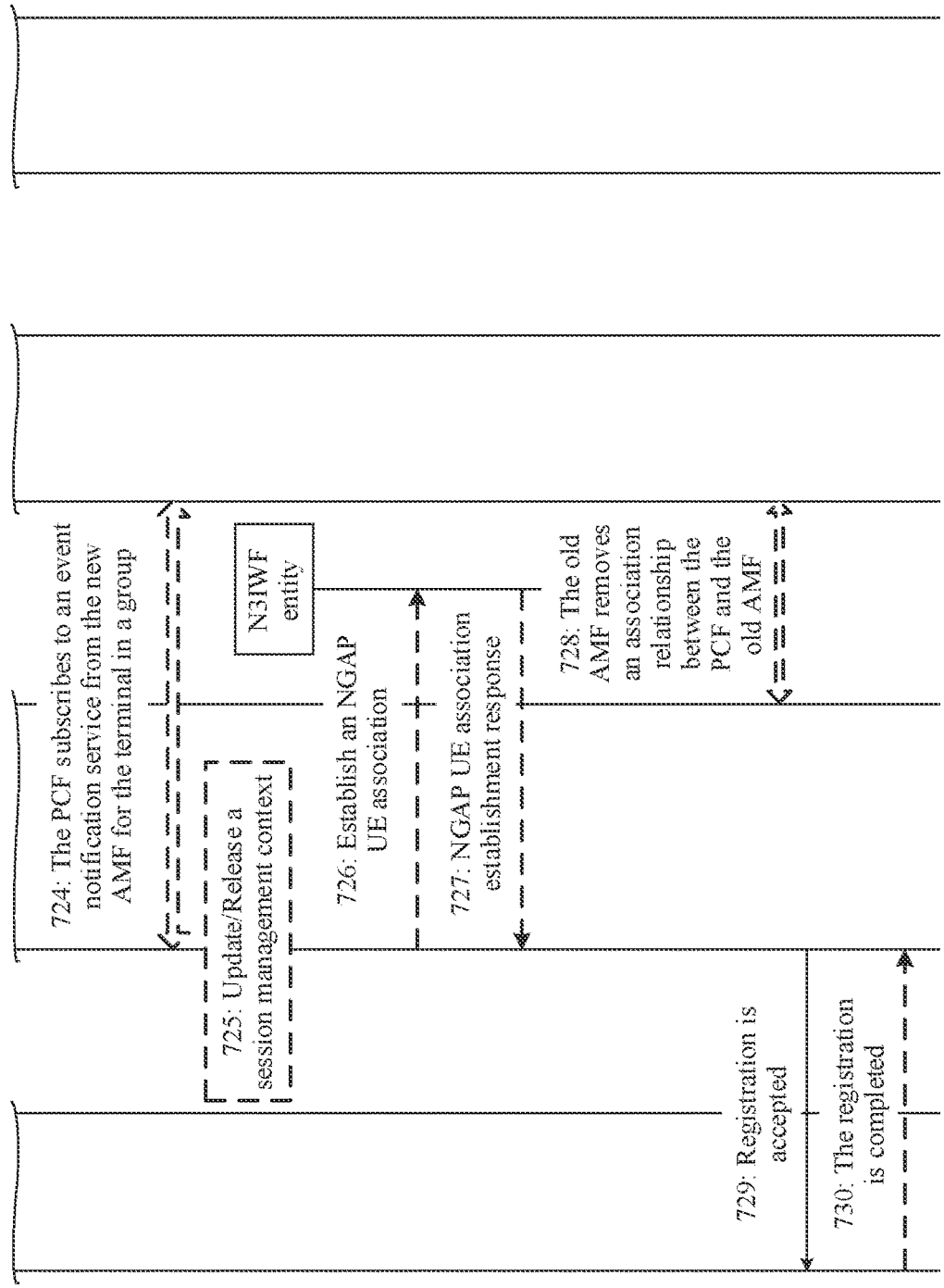

CONTEXT MANAGEMENT METHOD AND APPARATUS

CROSS-REFERENCE TO RELATED APPLICATIONS

This application is a continuation of U.S. patent application Ser. No. 16/953,953, filed on Nov. 20, 2020, which is a continuation of International Application No. PCT/CN2019/085731, filed on May 6, 2019, which claims priority to Chinese Patent Application No. 201810490361.7, filed on May 21, 2018. All of the aforementioned patent applications are hereby incorporated by reference in their entireties.

TECHNICAL FIELD

This application relates to the field of communications technologies, and in particular, to a context management method and apparatus.

BACKGROUND

Currently, an access and mobility management function (AMF for short) entity stores a terminal context by using a terminal as a granularity. In other words, on an AMF entity, a terminal stores one context of the terminal. With development of the internet of things, a quantity of terminals in a communications network sharply increases. Consequently, contexts of a large quantity of terminals occupy a large amount of storage space of the AMF entity.

SUMMARY

Embodiments of this application provide a context management method and apparatus, to resolve a problem that contexts of a large quantity of terminals occupy a large amount of storage space of an AMF entity.

To achieve the foregoing objective, the embodiments of this application provide the following technical solutions.

According to a first aspect, a context management method is provided. The method includes: when a first core network device has stored group information corresponding to a terminal, establishing, by the first core network device, a correspondence between the terminal and the group information. According to the method provided in the first aspect, the first core network device may establish the correspondence between the terminal and the group information when the group information has been stored, so that the first core network device does not need to separately store one piece of the group information for the terminal, thereby saving storage space of the first core network device.

In an embodiment, the group information includes group subscription information, group policy information, or group access information. In this possible embodiment, a plurality of pieces of group information are provided for a network, so that the network can select the group information as required, thereby improving network flexibility.

In an embodiment, the group access information is obtained based on the group policy information and the group subscription information.

In an embodiment, the method further includes: obtaining, by the first core network device, a group identifier of a group to which the terminal belongs; and determining, by the first core network device based on the group identifier, that the first core network device has stored the group information corresponding to the terminal. In this possible implementation, the first core network device can determine that the group information is stored, so that the first core network device determines that one piece of the group information does not need to be separately stored for the terminal, thereby saving storage space of the first core network device.

In an embodiment, the obtaining, by the first core network device, a group identifier of a group to which the terminal belongs includes: obtaining, by the first core network device from the terminal or a fourth core network device, the group identifier of the group to which the terminal belongs. In this possible implementation, the first core network device can obtain the group identifier, and further determine that the group information is stored.

In an embodiment, the method further includes: obtaining, by the first core network device, an identifier of the terminal; and determining, by the first core network device based on the identifier of the terminal, that the first core network device has stored the group information corresponding to the terminal. In this possible implementation, the first core network device can determine that the group information is stored, so that the first core network device determines that one piece of the group information does not need to be separately stored for the terminal, thereby saving storage space of the first core network device.

In an embodiment, the method further includes: updating, by the first core network device, the group information. In this possible implementation, the first core network device can update the group information, so that the group information adapts to a dynamically changing network environment.

With reference to the sixth possible implementation of the first aspect, in a seventh possible implementation, the updating, by the first core network device, the group information includes: when the group information is the group policy information or the group subscription information, receiving, by the first core network device, update information of the group information, and updating the group information based on the update information of the group information; or when the group information is the group access information, generating, by the first core network device, update information of the group information, and updating the group information based on the update information of the group information. In this possible implementation, the first core network device can update the group policy information, the group subscription information, or the group access information, so that the group policy information, the group subscription information, or the group access information adapts to a dynamically changing network environment.

In an embodiment, the method further includes: when an access network device accessed by the terminal does not store a first parameter in the group information, sending, by the first core network device, the identifier of the terminal and the first parameter to the access network device, where the first parameter is a group security parameter, a group paging parameter, a group QoS parameter, or a group MM parameter. In this possible implementation, when the access network device does not store the group parameter in the group information, the group parameter is sent to the access network device, so that the access network device stores the group parameter, thereby saving storage space of the access network device.

In an embodiment, the method further includes: when the access network device accessed by the terminal has stored a second parameter in the group information, sending, by the first core network device, the identifier of the terminal to the access network device, where the second parameter is a group security parameter, a group paging parameter, a group QoS parameter, or a group MM parameter. In this possible implementation, when the access network device has stored the group parameter in the group information, the second parameter is no longer sent to the access network device, thereby reducing transmission resources.

In an embodiment, the method further includes: sending, by the first core network device, update information of a third parameter in the group information to the access network device, where the third parameter is a group security parameter, a group paging parameter, a group QoS parameter, or a group MM parameter. In this possible implementation, the access network device can obtain the updated group parameter in time, thereby ensuring correct transmission of data of the terminal.

According to a second aspect, a context management method is provided. The method includes: when a first core network device does not store group information corresponding to a terminal, obtaining, by the first core network device, the group information; and creating, by the first core network device, a group context based on the group information, where the group context includes the group information. According to the method provided in the second aspect, when the first core network device does not store the group information, the first core network device may further create the group context based on the group information, so that only one piece of the group information of the terminals in one group may be stored, and a plurality of pieces of the group information do not need to be stored, thereby saving storage space of the first core network device.

In an embodiment, the group information includes group subscription information, group policy information, or group access information. In this possible implementation, a plurality of pieces of group information are provided for a network, so that the network can select the group information as required, thereby improving network flexibility.

In an embodiment, the method further includes: obtaining, by the first core network device, a group identifier of a group to which the terminal belongs; and determining, by the first core network device based on the group identifier, that the first core network device does not store the group information corresponding to the terminal. In this possible implementation, the first core network device can determine that the group information is not stored, so that the first core network device determines that one piece of the group information does not need to be separately stored for the terminal, thereby saving storage space of the first core network device.

In an embodiment, the obtaining, by the first core network device, a group identifier of a group to which the terminal belongs includes: obtaining, by the first core network device from the terminal or a fourth core network device, the group identifier of the group to which the terminal belongs. In this possible implementation, the first core network device can obtain the group identifier, and further determine that the group information is not stored.

In an embodiment, the method further includes: obtaining, by the first core network device, an identifier of the terminal; and determining, by the first core network device based on the identifier of the terminal, that the first core network device does not store the group information corresponding to the terminal.

In an embodiment, the first core network device can determine that the group information is not stored, so that the first core network device determines that one piece of the group information does not need to be separately stored for the terminal, thereby saving storage space of the first core network device.

In an embodiment, the obtaining, by the first core network device, the group information includes: when the group information is the group policy information, receiving, by the first core network device, the group policy information from a second core network device; or when the group information is the group subscription information, receiving, by the first core network device, the group subscription information from a third core network device; or when the group information is the group access information, generating, by the first core network device, the group access information. In this possible implementation, the first core network device can obtain the group policy information, the group subscription information, or the group access information, to create the group context.

In an embodiment, the creating, by the first core network device, a group context based on the group information includes: storing, by the first core network device, the group information in the group context.

In an embodiment, the group access information is obtained based on the group policy information and the group subscription information.

In an embodiment, the method further includes: updating, by the first core network device, the group information. In this possible implementation, the first core network device can update the group information, so that the group information adapts to a dynamically changing network environment.

In an embodiment, the updating, by the first core network device, the group information includes: when the group information is the group policy information or the group subscription information, receiving, by the first core network device, update information of the group information, and updating the group information based on the update information of the group information; or when the group information is the group access information, generating, by the first core network device, update information of the group information, and updating the group information based on the update information of the group information. In this possible implementation, the first core network device can update the group policy information, the group subscription information, or the group access information, so that the group policy information, the group subscription information, or the group access information adapts to a dynamically changing network environment.

In an embodiment, the method further includes: when an access network device accessed by the terminal does not store a first parameter in the group information, sending, by the first core network device, the identifier of the terminal and the first parameter to the access network device, where the first parameter is a group security parameter, a group paging parameter, a group QoS parameter, or a group MM parameter. In this possible implementation, when the access network device does not store the group parameter in the group information, the group parameter is sent to the access network device, so that the access network device stores the group parameter, thereby saving storage space of the access network device.

In an embodiment, the method further includes: when the access network device accessed by the terminal has stored a second parameter in the group information, sending, by the first core network device, the identifier of the terminal to the access network device, where the second parameter is a group security parameter, a group paging parameter, a group QoS parameter, or a group MM parameter. In this possible implementation, when the access network device has stored the group parameter in the group information, the second parameter is no longer sent to the access network device, thereby reducing transmission resources.

In an embodiment, the method further includes: sending, by the first core network device, update information of a third parameter in the group information to the access network device, where the third parameter is a group security parameter, a group paging parameter, a group QoS parameter, or a group MM parameter. In this possible implementation, the access network device can obtain the updated group parameter in time, thereby ensuring correct transmission of data of the terminal.

According to a third aspect, a context management method is provided. The method includes: obtaining, by a first core network device, group access information based on group policy information and group subscription information; and creating, by the first core network device, a group context based on the group access information, where the group context includes the group access information. According to the method provided in the third aspect, the first core network device may further obtain the group access information, and create the group context based on the group access information, so that only one piece of the group access information of the terminal in one group may be stored, and a plurality of pieces of the group access information do not need to be stored, thereby saving storage space of the first core network device.

In an embodiment, the method further includes: updating, by the first core network device, the group context. In this possible implementation, the first core network device can update the group context, so that the group context adapts to a dynamically changing network environment.

In an embodiment, the updating, by the first core network device, the group context includes: receiving, by the first core network device, group policy update information, and obtaining group access update information based on the group policy update information, and updating the group access information in the group context based on the group access update information; or receiving, by the first core network device, group subscription update information, obtaining group access update information based on the group subscription update information, and updating the group access information in the group context based on the group access update information; or generating, by the first core network device, group access update information, and updating the group access information in the group context based on the group access update information. In this possible implementation, the first core network device can update the group policy information, the group subscription information, or the group access information, so that the group policy information, the group subscription information, or the group access information adapts to a dynamically changing network environment.

In an embodiment, the method further includes: when an access network device accessed by the terminal does not store a first parameter in the group information, sending, by the first core network device, an identifier of the terminal and the first parameter to the access network device, where the first parameter is a group security parameter, a group paging parameter, a group QoS parameter, or a group MM parameter. In this possible implementation, when the access network device does not store the group parameter in the group information, the group parameter is sent to the access network device, so that the access network device stores the group parameter, thereby saving storage space of the access network device.

In an embodiment, the method further includes: when an access network device accessed by the terminal has stored a second parameter in the group information, sending, by the first core network device, the identifier of the terminal to the access network device, where the second parameter is a group security parameter, a group paging parameter, a group QoS parameter, or a group MM parameter. In this possible implementation, when the access network device has stored the group parameter in the group information, the second parameter is no longer sent to the access network device, thereby reducing transmission resources.

In an embodiment, the method further includes: sending, by the first core network device, update information of a third parameter in the group information to the access network device, where the third parameter is a group security parameter, a group paging parameter, a group QoS parameter, or a group MM parameter. In this possible implementation, the access network device can obtain the updated group parameter in time, thereby ensuring correct transmission of data of the terminal.

According to a fourth aspect, a context management method is provided. The method includes: receiving, by an access network device, an identifier of a terminal and a group parameter of the terminal from a first core network device; and creating, by the access network device based on the group parameter, a group context, on the access network device, of a group to which the terminal belongs, where the group parameter includes at least one of a group security parameter, a group paging parameter, a group QoS parameter, and a group MM parameter. According to the method provided in the fourth aspect, after receiving the group parameter sent by the first core network device, the access network device may create, on the access network device, the group context, on the access network device, of the group to which the terminal belongs, so that the access network device does not store a plurality of group parameters (or group contexts), thereby saving storage space of the access network device.

In an embodiment, the method further includes: receiving, by the access network device, update information of any parameter in the group parameter from the first core network device; and updating, by the access network device, the group context based on the update information. In this possible implementation, the access network device can obtain the updated group parameter (for example, the any parameter) in time and update the group parameter, thereby ensuring correct transmission of data of the terminal.

In an embodiment, the method further includes: if RRC connection statuses of all terminals that access the access network device and that are in the group are all idle states, deleting, by the access network device, the group context; or if RRC connection statuses of all terminals that correspond to the group context and that are stored on the access network device are all idle states, deleting, by the access network device, the group context. In this possible implementation, the access network device can delete the group context in the access network device in time, to release storage space of the access network device.

According to a fifth aspect, a context management method is provided. The method includes: receiving, by an access network device, an identifier of a terminal from a first core network device; and establishing, by the access network device based on the identifier of the terminal, a correspondence between the terminal and a group context that is of a group to which the terminal belongs and that has been stored on the access network device. According to the method provided in the fifth aspect, after receiving the identifier of the terminal sent by the first core network device, the access network device may establish, based on the identifier of the terminal, the correspondence between the terminal and the group context that is of the group to which the terminal belongs and that has been stored on the access network device. Therefore, the access network device does not store the group context of the terminal, thereby saving storage space of the access network device.

In an embodiment, the method further includes: receiving, by the access network device, update information of a fourth parameter in the group context from the first core network device, where the fourth parameter is a group security parameter, a group paging parameter, a group QoS parameter, or a group MM parameter; and updating, by the access network device based on the update information, the group context that has been stored on the access network device. In this possible implementation, the access network device can obtain the updated group parameter (for example, the fourth parameter) in time and update the group parameter, thereby ensuring correct transmission of data of the terminal.

In an embodiment, the method further includes: if RRC connection statuses of all terminals that access the access network device and that are in the group are all idle states, deleting, by the access network device, the group context; or if RRC connection statuses of all terminals that correspond to the group context and that are stored on the access network device are all idle states, deleting, by the access network device, the group context. In this possible implementation, the access network device can delete the group context in the access network device in time, to release storage space of the access network device.

According to a sixth aspect, a context management method is provided. The method includes: sending, by a second core network device, group policy information corresponding to a terminal to a first core network device. According to the method provided in the sixth aspect, the first core network device can obtain the group policy information corresponding to the terminal.

In an embodiment, the method further includes: if the group policy information in the second core network device is updated, sending, by the second core network device, updated group policy information to the first core network device. In this possible implementation, the first core network device can obtain updated group policy information and update the group policy information, so that the group policy information adapts to a dynamically changing network environment.

In an embodiment, that the group policy information is updated includes: receiving, by the second core network device, update information of the group policy information, and updating the group policy information based on the update information. In this possible implementation, the second core network device can obtain the updated group policy information.

According to a seventh aspect, a context management method is provided. The method includes: if group subscription information corresponding to a terminal in a third core network device is updated, sending, by the third core network device, updated group subscription information to a first core network device. According to the method provided in the seventh aspect, the first core network device can obtain the updated group subscription information and update the group subscription information, so that the group subscription information adapts to a dynamically changing network environment.

In an embodiment, that the group subscription information is updated includes: receiving, by the third core network device, update information of the group subscription information, and updating the group subscription information based on the received update information; or periodically updating, by the third core network device, the group subscription information. In this possible implementation, the third core network device can obtain the updated group subscription information.

According to an eighth aspect, a context management method is provided. The method includes: sending, by a terminal to a first core network device, a group identifier of a group to which the terminal belongs, where the group identifier is used to determine group information corresponding to the terminal. According to the method provided in the eighth aspect, the first core network device can obtain the group identifier, so that the first core network device determines whether the group information is stored.

According to a ninth aspect, a terminal context management method is provided. The method includes: obtaining, by a first core network device, a group identifier of a group to which a terminal belongs; when the first core network device has stored a group context corresponding to the group identifier, establishing, by the first core network device, a correspondence between the terminal and the group context; and/or creating, by the first core network device, the group context when the first core network device does not store the group context corresponding to the group identifier. According to the method provided in the ninth aspect, the first core network device may establish the correspondence between the terminal and the group context when the group context corresponding to the group identifier has been stored, so that the first core network device does not need to separately store one piece of content in the group context for the terminal, thereby saving storage space of the first core network device. Alternatively, the first core network device may create the group context when the first core network device does not store the group context corresponding to the group identifier, so that only one piece of content in the group context of the terminal in one group may be stored, and a plurality of pieces of the content do not need to be stored, thereby saving storage space of the first core network device.

In an embodiment, the group context includes at least one of group subscription information, group policy information, and group access information. In this possible implementation, a plurality of group contexts are provided for a network, so that the network can select the group context as required, thereby improving network flexibility.

In an embodiment, the creating, by the first core network device, the group context includes: receiving, by the first core network device, the group policy information from a second core network device; and storing, by the first core network device, the group policy information in the group context. In this possible implementation, the first core network device can obtain the group policy information, to create the group context.

In an embodiment, the creating, by the first core network device, the group context includes: receiving, by the first core network device, the group subscription information from a third core network device; and storing, by the first core network device, the group subscription information in the group context. In this possible implementation, the first core network device can obtain the group subscription information, to create the group context.

In an embodiment, the group access information is obtained based on the group policy information and the group subscription information. In this possible implementation, the first core network device can obtain the group access information, to create the group context.

In an embodiment, the method further includes: when an access network device accessed by the terminal does not store a first parameter in the group context, sending, by the first core network device, an identifier of the terminal, the group identifier, and the first parameter to the access network device, where the first parameter is a group security parameter, a group paging parameter, a group QoS parameter, or a group MM parameter. In this possible implementation, when the access network device does not store the group parameter (for example, the first parameter) in the group context, the group parameter is sent to the access network device, so that the access network device stores the group parameter, thereby saving storage space of the access network device.

In an embodiment, the method further includes: when the access network device accessed by the terminal has stored a second parameter in the group context, sending, by the first core network device, the group identifier and the identifier of the terminal to the access network device, where the second parameter is a group security parameter, a group paging parameter, a group QoS parameter, or a group MM parameter. In this possible implementation, when the access network device has stored the group parameter (for example, the second parameter) in the group context, the group parameter is no longer sent to the access network device, thereby reducing transmission resources.

In an embodiment, the method further includes: updating, by the first core network device, the group context. In this possible implementation, the first core network device can update the group context, so that the group context adapts to a dynamically changing network environment.

In an embodiment, the updating, by the first core network device, the group context includes: receiving, by the first core network device, group policy update information of the group, and updating the group policy information in the group context based on the group policy update information; or receiving, by the first core network device, group subscription update information of the group, and updating the group subscription information in the group context based on the group subscription update information; or generating, by the first core network device, group access update information of the group, and updating the group access information in the group context based on the group access update information. In this possible implementation, the first core network device can update the group context, so that the group context adapts to a dynamically changing network environment.

In an embodiment, the method further includes: sending, by the first core network device, update information of a third parameter in the group context to the access network device, where the third parameter is a group security parameter, a group paging parameter, a group QoS parameter, or a group MM parameter.

In an embodiment, the access network device can obtain the updated group parameter (for example, the third parameter) in time, thereby ensuring correct transmission of data of the terminal.

In an embodiment, the obtaining, by the first core network device, a group identifier of a group to which the terminal belongs includes: obtaining, by the first core network device from the terminal or a fourth core network device, the group identifier of the group to which the terminal belongs. In this possible implementation, the first core network device can obtain the group identifier, to create the group context.

According to a tenth aspect, a terminal context management method is provided. The method includes: receiving, by an access network device from a first core network device, an identifier of a terminal, a group identifier of a group to which the terminal belongs, and information in a group context corresponding to the group identifier on the first core network device; and storing, by the access network device, the information in the group context corresponding to the group identifier on the access network device, and establishing a correspondence between the terminal and the group context corresponding to the group identifier on the access network device, where the information includes at least one of a group security parameter, a group paging parameter, a group QoS parameter, and a group MM parameter. According to the method provided in the tenth aspect, after receiving the group parameter (that is, the information) sent by the first core network device, the access network device may store the group parameter in the group context of the access network device. Therefore, the access network device does not store a plurality of group parameters, thereby saving storage space of the access network device.

In an embodiment, the method further includes: receiving, by the access network device, update information of any parameter in the information from the first core network device; and updating, by the access network device based on the update information, the group context corresponding to the group identifier on the access network device. In this possible implementation, the access network device can obtain the updated group parameter (for example, the any parameter) in time and update the group parameter, thereby ensuring correct transmission of data of the terminal.

In an embodiment, the method further includes: if RRC connection statuses of all terminals that access the access network device and that are in the group are all idle states, deleting, by the access network device, the group context of the group stored on the access network device; or if RRC connection statuses of all terminals that correspond to the group context and that are stored on the access network device are all idle states, deleting, by the access network device, the group context stored on the access network device. In this possible implementation, the access network device can delete the group context in the access network device in time, to release storage space of the access network device.

According to an eleventh aspect, a terminal context management method is provided. The method includes: receiving, by an access network device from a first core network device, an identifier of a terminal and a group identifier of a group to which the terminal belongs; and establishing, by the access network device based on the group identifier, a correspondence between the terminal and a group context that corresponds to the group identifier and that has been stored on the access network device. According to the method provided in the eleventh aspect, after receiving the identifier of the terminal and the group identifier of the group to which the terminal belongs that are sent by the first core network device, the access network device may establish, based on the group identifier, the correspondence between the terminal and the group context that is of the group to which the terminal belongs and that has been stored on the access network device. Therefore, the access network device does not store the group context of the terminal, thereby saving storage space of the access network device.

In an embodiment, the method further includes: receiving, by the access network device from the first core network device, update information of a fourth parameter in the group context that corresponds to the group identifier and that has been stored on the access network device, where the fourth parameter is a group security parameter, a group paging parameter, a group QoS parameter, or a group MM parameter; and updating, by the access network device based on the update information, the group context that corresponds to the group identifier and that has been stored on the access network device. In this possible implementation, the access network device can obtain the updated group parameter (for example, the fourth parameter) in time and update the group parameter, thereby ensuring correct transmission of data of the terminal.

In an embodiment, the method further includes: if RRC connection statuses of all terminals that access the access network device and that are in the group are all idle states, deleting, by the access network device, the group context of the group stored on the access network device; or if RRC connection statuses of all terminals that correspond to the group context and that are stored on the access network device are all idle states, deleting, by the access network device, the group context stored on the access network device. In this possible implementation, the access network device can delete the group context in the access network device in time, to release storage space of the access network device.

According to a twelfth aspect, a terminal context management method is provided. The method includes: receiving, by a second core network device, a group identifier of a group from a first core network device; and sending, by the second core network device, group policy information corresponding to the group identifier to the first core network device. According to the method provided in the twelfth aspect, the first core network device can obtain the group policy information corresponding to the terminal.

In an embodiment, the method further includes: if the group policy information in the second core network device is updated, sending, by the second core network device, updated group policy information to the first core network device. In this possible implementation, the first core network device can obtain updated group policy information and update the group policy information, so that the group policy information adapts to a dynamically changing network environment.

In an embodiment, that the group policy information is updated includes: receiving, by the second core network device, update information of the group policy information, and updating the group policy information based on the update information. In this possible implementation, the second core network device can obtain the updated group policy information.

According to a thirteenth aspect, a terminal context management method is provided. The method includes: if group subscription information in a third core network device is updated, sending, by the third core network device, updated group subscription information to a first core network device. According to the method provided in the thirteenth aspect, the first core network device can obtain the updated group subscription information and update the group subscription information, so that the group subscription information adapts to a dynamically changing network environment.

In an embodiment, that the group subscription information is updated includes: receiving, by the third core network device, update information of the group subscription information, and updating the group subscription information based on the received update information; or periodically updating, by the third core network device, the group subscription information. In this possible implementation, the third core network device can obtain the updated group subscription information.

According to a fourteenth aspect, a terminal context management method is provided. The method includes: sending, by a terminal to a first core network device, a group identifier of a group to which the terminal belongs, where the group identifier is used to determine a group context of the group.

According to the method provided in the fourteenth aspect, the first core network device can obtain the group identifier.

According to a fifteenth aspect, a context management method is provided. The method includes: updating, by a first core network device, a group context of a group to which a terminal belongs.

In an embodiment, the group context includes at least one of group subscription information, group policy information, and group access information.

In an embodiment, the updating, by a first core network device, a group context of a group to which a terminal belongs includes: receiving, by the first core network device, group policy update information of the group, and updating the group policy information in the group context based on the group policy update information; or receiving, by the first core network device, group subscription update information of the group, and updating the group subscription information in the group context based on the group subscription update information; or generating, by the first core network device, group access update information of the group, and updating the group access information in the group context based on the group access update information.

In an embodiment, the method further includes: sending, by the first core network device, update information of a third parameter in the group context to an access network device accessed by the terminal, where the third parameter is a group security parameter, a group paging parameter, a group QoS parameter, or a group MM parameter.

In an embodiment, the group access information is obtained based on the group policy information and the group subscription information.

For beneficial effects of various possible implementations of the fifteenth aspect, refer to the foregoing descriptions. Details are not described again.

According to a sixteenth aspect, a context management method is provided. The method includes: if RRC connection statuses of all terminals that access an access network device and that are in a group to which the terminal belongs are all idle states, deleting, by the access network device, a group context that is of the group and that is stored in the access network device, where the access network device is an access network device accessed by the terminal; or if RRC connection statuses of all terminals corresponding to a group context stored in an access network device accessed by the terminal are all idle states, deleting, by the access network device, the group context stored in the access network device, where the group context is a group context of a group to which the terminal belongs; or if RRC connection statuses of all terminals in a group that corresponds to a group identifier of a group to which the terminal belongs and that is on an access network device accessed by the terminal are all idle states, deleting, by the access network device, a group context that is of the group and that is stored on the access network device.

According to the method provided in the sixteenth aspect, the access network device can delete the group context in the access network device in time, to release storage space of the access network device.

According to a seventeenth aspect, a context management apparatus is provided. The apparatus may be the first core network device, the second core network device, the third core network device, the access network device, or the terminal. The apparatus may exist in a product form of a chip. When the apparatus is the first core network device, the apparatus has any method provided in any one of the first aspect to the third aspect, the ninth aspect, and the fifteenth aspect. When the apparatus is the access network device, the apparatus has any method provided in any one of the fourth aspect, the fifth aspect, the tenth aspect, the eleventh aspect, and the sixteenth aspect. When the apparatus is the second core network device, the apparatus has any method provided in the sixth aspect or the twelfth aspect. When the apparatus is the third core network device, the apparatus has any method provided in the seventh aspect or the thirteenth aspect. When the apparatus is the terminal, the apparatus has any method provided in the eighth aspect or the fourteenth aspect.

According to an eighteenth aspect, a context management apparatus is provided. The apparatus includes a memory, a processor, at least one communications interface, and a communications bus, where the memory is configured to store a computer executable instruction; the processor, the memory, and the at least one communications interface are connected through the communications bus; and the processor executes the computer executable instruction stored in the memory. The apparatus may be the first core network device, the second core network device, the third core network device, the access network device, or the terminal. The apparatus may exist in a product form of a chip. When the apparatus is the first core network device, the apparatus has any method provided in any one of the first aspect to the third aspect, the ninth aspect, and the fifteenth aspect. When the apparatus is the access network device, the apparatus has any method provided in any one of the fourth aspect, the fifth aspect, the tenth aspect, the eleventh aspect, and the sixteenth aspect. When the apparatus is the second core network device, the apparatus has any method provided in the sixth aspect or the twelfth aspect. When the apparatus is the third core network device, the apparatus has any method provided in the seventh aspect or the thirteenth aspect. When the apparatus is the terminal, the apparatus has any method provided in the eighth aspect or the fourteenth aspect.

According to a nineteenth aspect, a computer-readable storage medium is provided. The computer-readable storage medium includes an instruction, and when the instruction is run on a computer, the computer is enabled to perform the method according to any one of the first aspect to the sixteenth aspect.

According to a twentieth aspect, a computer program product including an instruction is provided. When the computer program product is run on a computer, the computer is enabled to perform the method according to any one of the first aspect to the sixteenth aspect.

For technical effects brought by any design manner in the seventeenth aspect to the twentieth aspect, refer to technical effects brought by different design manners in the first aspect to the sixteenth aspect. Details are not described herein again.

BRIEF DESCRIPTION OF DRAWINGS

FIG. 3 to FIG. 9 each are a flowchart of a context management method according to an embodiment of this application.

DESCRIPTION OF EMBODIMENTS

Figure 1:
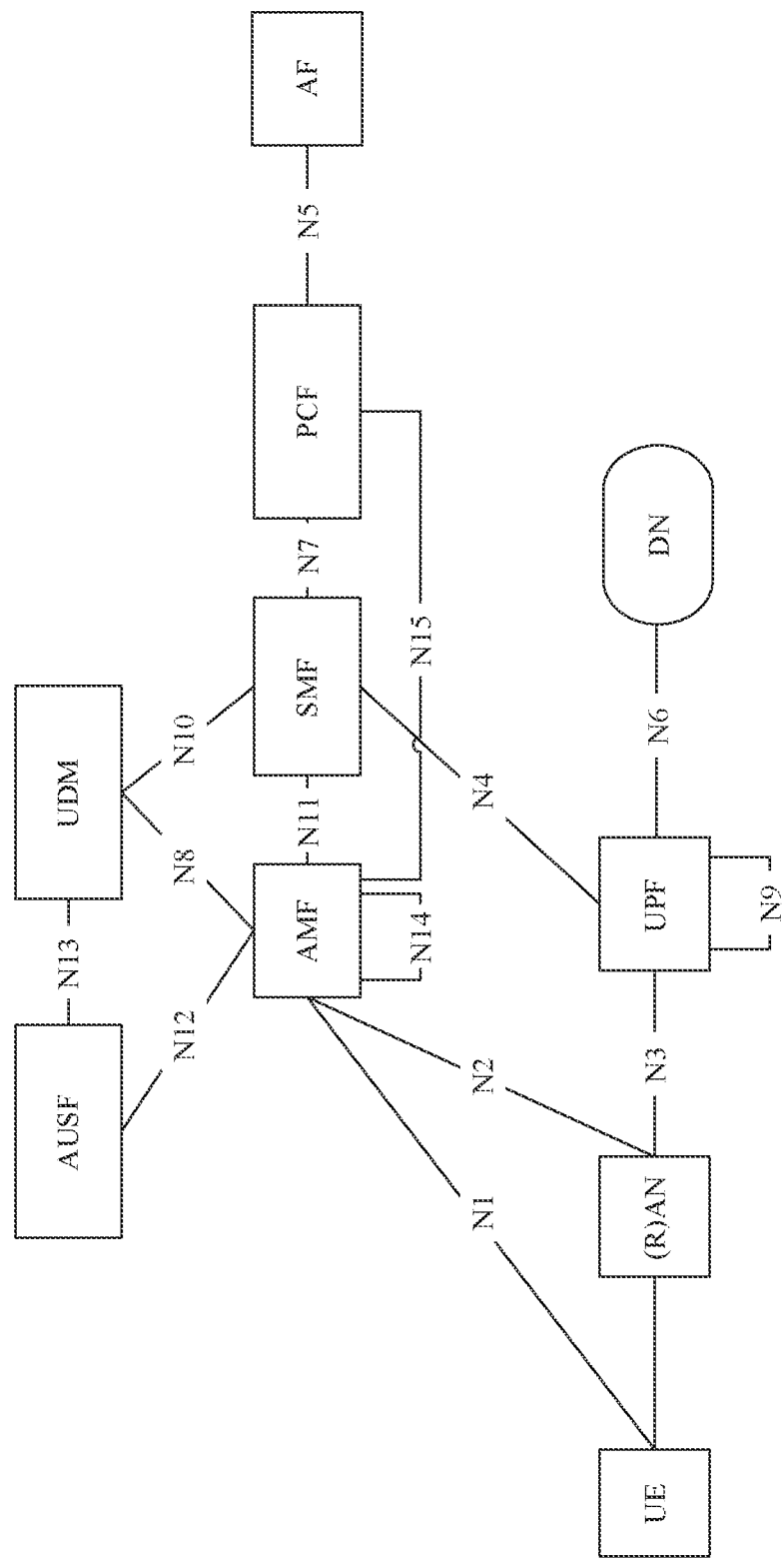
FIG. 1 is a schematic diagram of a network architecture according to an embodiment of this application.

The following describes the technical solutions in embodiments of this application with reference to accompanying drawings in the embodiments of this application. In the descriptions of this application, "I" means "or" unless otherwise specified. For example, A/B may represent A or B. The term "and/or" in this specification describes only an association relationship for associated objects and represents that three relationships may exist. For example, A and/or B may represent the following three cases: Only A exists, both A and B exist, and only B exists. In description of this application, the term "a plurality of" means two or more than two unless otherwise specified. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not constitute a limitation on a quantity or an execution sequence, and that the terms such as "first" and "second" do not indicate a definite difference.

The technical solutions in the embodiments of this application may be applied to various data processing communications systems, for example, code division multiple access (CDMA for short), time division multiple access (TDMA for short), frequency division multiple access (FDMA for short), orthogonal frequency-division multiple access (OFDMA for short), single carrier frequency-division multiple access (SC-FDMA for short), other systems, and the like. The terms "system" and "network" can be interchanged with each other. The CDMA system can implement radio technologies such as universal terrestrial radio access (UTRA for short) and CDMA2000. UTRA may include a wideband CDMA (WCDMA for short) technology and another variation technology of CDMA. CDMA2000 may cover the interim standard (IS for short) 2000 (IS-2000), the IS-95 standard, and the IS-856 standard. A radio technology such as a global system for mobile communications (GSM for short) may be implemented in the TDMA system. The OFDMA system may implement radio technologies such as evolved universal terrestrial radio access (evolved UTRA, E-UTRA for short), ultra mobile broadband (UMB for short), institute of electrical and electronics engineers (IEEE for short) 802.11 (Wi-Fi), IEEE 802.16 (WiMAX), IEEE 802.20, and Flash OFDMA. UTRA and E-UTRA are universal mobile telecommunications system (UMTS for short) and evolved versions of UMTS. The 3rd Generation Partnership Project (3GPP for short) is a new version of UMTS using E-UTRA in long term evolution (LTE for short) and various versions based on LTE evolution. A 5th-generation (5G for short) communications system and new radio (NR for short) are next-generation communications systems that are under research. In addition, the communications systems may further be applicable to a future-oriented communications technology, and are all applicable to the technical solutions provided in the embodiments of this application.

For example, a method provided in the embodiments of this application may be applied to a 5G network. FIG. 1 is an example of a schematic diagram of a network architecture of a 5G network. In the schematic diagram, the 5G network may include the following plurality of network functions (NF for short) entities: an authentication server function (AUSF for short) entity, an AMF entity, a data network (DN for short), a unified data management (UDM for short) entity, a policy control function (PCF for short) entity, a (radio) access network (((R)AN for short) entity, a user plane function (UPF for short) entity, user equipment (UE for short), an application function (AF for short) entity, a session management function (SMF for short) entity, and the like. The UE may also be referred to as a terminal (terminal). For ease of description, the UE is collectively referred to as a terminal in the embodiments of this application.

It may be understood that, in addition to the function entities shown in FIG. 1, the network architecture of the 5G network may further include another function entity. For example, a network exposure function (NEF for short) entity may also be included between the AF entity and the PCF entity. In the embodiments of this application, an entity may be a network element or a device, or may be a virtual device, or may be a function module on a physical device, or the like.

The UDM entity, the AUSF entity, the PCF entity, the AMF entity, and the SMF entity in FIG. 1 may also be collectively referred to as a control plane function (control plane function, CPF for short) entity. This is not limited in the embodiments of this application.

It should be noted that the (R)AN entity, the AMF entity, the SMF entity, the AUSF entity, the UDM entity, the UPF entity, the PCF entity, and the like in FIG. 1 are merely names, and the names constitute no limitation on entities. In the 5G network and other future networks, network elements or devices corresponding to these entities may also have other names. This is not limited in the embodiments of this application. For example, the UDM entity may alternatively be replaced with a home subscriber server (HSS for short), a user subscription database (USD for short), a database entity, or the like. The description is provided herein, and is not provided below again.

For ease of description, the (R)AN entity, the AMF entity, the SMF entity, the UDM entity, the UPF entity, the PCF entity, and the CPF entity are respectively referred to as an (R)AN, an AMF, an SMF, a UDM, a UPF, a PCF, and a CPF in the following.

Specifically, the (R)AN is a network including a plurality of 5G-RAN nodes, and implements a radio physical layer function, resource scheduling and radio resource management, radio access control, and a mobility management function. The 5G-RAN node is connected to the UPF through a user plane interface N3, and is configured to transmit data of a terminal. The 5G-RAN node establishes a control plane signaling connection to the AMF through a control plane interface N2, to implement functions such as radio access bearer control. The AMF is mainly responsible for functions such as registration management of the terminal, connection management of the terminal, reachability management of the terminal, access authorization and access authentication of the terminal, a security function of the terminal, mobility management of the terminal, network slice selection, and SMF selection. The AMF serves as an anchor for N1 and N2 signaling connections, provides the SMF with routing of a session management (session management, SM for short) message through an N1/N2 interface, and maintains and manages status information of the terminal. The SMF is mainly responsible for all control plane functions in terminal session management, where the control plane functions include UPF selection and control, internet protocol (internet protocol, IP for short) address assignment and management, quality of service (QoS for short) management of a session, obtaining a policy and charging control (PCC for short) policy from the PCF, and the like. The SMF also serves as a termination point of an SM part in a non-access stratum (NAS for short) message. As an anchor point of a packet data unit (PDU for short) session connection, the UPF is responsible for data packet filtering, data transmission/forwarding, rate control, charging information generation, user plane QoS processing, uplink transmission authentication, transmission class verification, buffering of downlink data packets, and downlink data notification triggering of the terminal. The UPF may also serve as a branching point for a multi-homed PDU session.

The method provided in the embodiments of this application may further be applied to a network slice of a 5G network. A network slicing technology divides a physical network into a plurality of virtual end-to-end networks. Devices, access technologies, transmission paths, and core networks on each virtual network are logically independent of each other. Each network slice is constituted by instantiating one independent network function or function combination, has a different function and feature, and faces a different requirement and service. The network slices are isolated so that different users or user groups can flexibly and dynamically define and customize network capabilities based on different application scenarios and requirements of the users or user groups, without affecting each other.

One network slice includes a CPF and a UPF. The CPF mainly completes access control and mobility management functions such as access authentication, security encryption, and location registration of the terminal, and session management functions such as establishment, release, and change of a user plane transmission path. The UPF mainly completes functions such as routing and forwarding of user plane data.

In an embodiment, a terminal may include various devices: a handheld device having a wireless communication function, a vehicle-mounted device, a wearable device, a computing device, and another processing device connected to a wireless modem, and may further include a subscriber unit (subscriber unit), a cellular phone (cellular phone), a smartphone (smart phone), a wireless data card, a personal digital assistant (personal digital assistant, PDA for short) computer, a tablet computer, a wireless modem (modem), a handheld device (handheld), a laptop computer (laptop computer), a cordless phone (cordless phone), a wireless local loop (wireless local loop, WLL for short) station, a machine type communication (machine type communication, MTC for short) terminal, a mobile station (mobile station, MS for short), a terminal device (terminal device), and the like.

System architectures described in the embodiments of this application are intended to more clearly describe the technical solutions in the embodiments of this application, and does not constitute a limitation on the technical solutions provided in the embodiments of this application. A person of ordinary skill in the art may know that, with evolution of network architectures and emergence of new service scenarios, the technical solutions provided in the embodiments of this application are also applied to a similar technical issue. In the embodiments of this application, an example in which the provided method is applied to a 5G network is used for description. However, it should be noted that the method provided in the embodiments of this application may also be applied to another network. For example, the method may be applied to an LTE system. In this case, correspondingly, a network node (for example, a first core network device or a second core network device below) that performs the method provided in the embodiments of this application is replaced with a network node that has a same or corresponding function in the LTE system.

Figure 2:
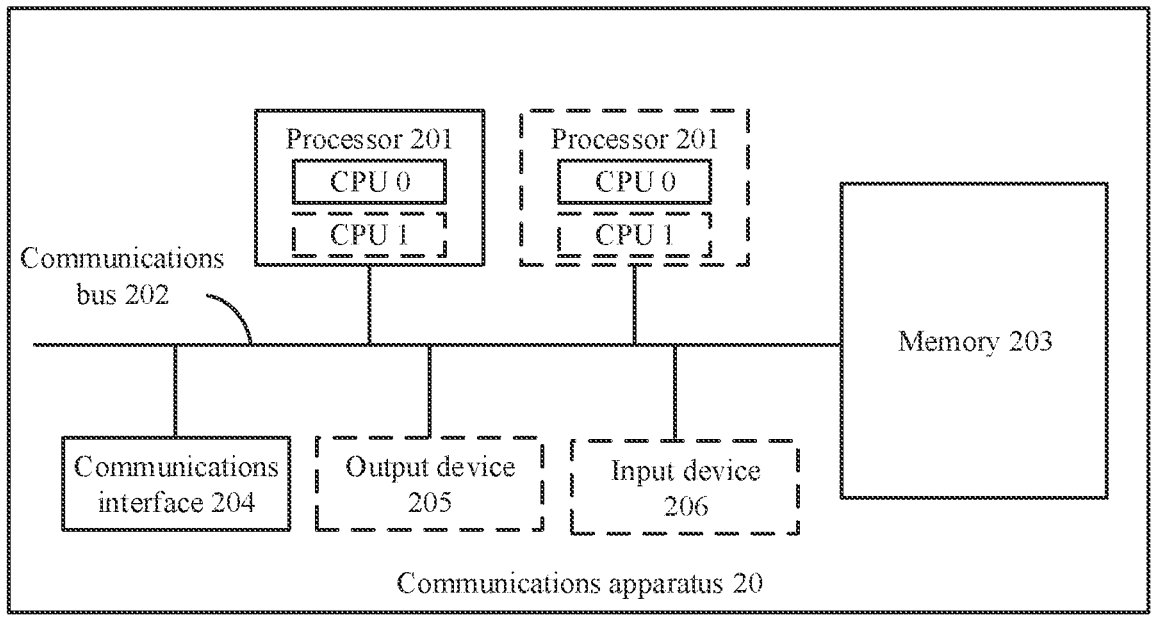
FIG. 2 is a schematic diagram of a hardware structure of a communications apparatus according to an embodiment of this application.

To implement the method provided in the embodiments of this application, an embodiment of this application provides a communications apparatus. FIG. 2 is a schematic diagram of a hardware structure of a communications apparatus according to an embodiment of this application. The communications apparatus may be a first core network device, a second core network device, a third core network device, a fourth core network device, a terminal, or an access network device in the following. Alternatively, the communications apparatus may be a system on chip or a chip located on a first core network device, a second core network device, a third core network device, a fourth core network device, a terminal, or an access network device. This is not limited. The communications apparatus 20 includes at least one processor 201, a communications bus 202, a memory 203, and at least one communications interface 204.

The processor 201 may be one or more general-purpose central processing units (CPU for short), application-specific integrated circuits (ASIC for short), or one or more integrated circuits configured to control program execution of the solutions in this application.

The communications bus 202 is used for communication between the foregoing components, to transmit information.

The communications interface 204 is configured to communicate with another device or a communications network such as the Ethernet, a RAN device, or a wireless local area network (WLAN for short), and may use any apparatus such as a transceiver.

The memory 203 is configured to store a computer executable instruction for executing the solutions in this application, and the processor 201 controls the execution of the computer executable instruction. The processor 201 is configured to execute the computer executable instruction stored in the memory 203, to implement actions of a first core network device (for example, an AMF or a new AMF), a second core network device (for example, a PCF), a third core network device (for example, a UDM), a fourth core network device, a terminal, or an access network device in methods provided in the following embodiments of this application. The memory 203 may be a read-only memory (ROM for short) or another type of static storage device that can store static information and instructions, a random access memory (random access memory, RAM for short) or another type of dynamic storage device that can store information and instructions, or may be an electrically erasable programmable read-only memory (EEPROM for short), a compact disc read-only memory (CD-ROM for short) or another compact disc storage, an optical disc storage (including a compressed optical disc, a laser disc, an optical disc, a digital versatile disc, a blue-ray optical disc, and the like), or a magnetic disk storage medium or another magnetic storage device, or any other medium that can carry or store expected program code in a form of an instruction or a data structure and that can be accessed by a computer, but is not limited thereto. The memory 203 may exist independently and is connected to the processor 201 through the communications bus 202. Alternatively, the memory 203 may be integrated with the processor 201.

In an embodiment, the computer executable instruction may also be referred to as application program code, and this is not limited in this embodiment of this application.

In an embodiment, the processor 201 may include one or more CPUs, for example, a CPU 0 and a CPU 1 in FIG. 2.

In an embodiment, the communications apparatus 20 may include a plurality of processors, for example, the processor 201 and a processor 208 in FIG. 2. Each of the processors may be a single-core (single-CPU) processor, or may be a multi-core (multi-CPU) processor. The processor herein may refer to one or more devices, circuits, and/or processing cores configured to process data (for example, a computer program instruction).

In an embodiment, the communications apparatus 20 may further include an output device 205 and an input device 206. The output device 205 communicates with the processor 201, and may display information in a plurality of manners. The input device 206 communicates with the processor 201, and may receive an input in various manners.

The first core network device in an embodiment of this application may be an AMF, an MME, or another device having a similar function. The second core network device may be a PCF, a policy and charging rules function (policy and charging rules function, PCRF for short), or another device having a similar function. The access network device may be a RAN node, for example, a base station, a relay node (RN for short), or an integrated access and backhaul (integrated access and backhaul, IAB for short) node. The third core network device may be a UDM, a home subscriber server (HSS for short), or another device with a similar function. The fourth core network device and the third core network device may be the same or may be different. In this embodiment of this application, an example in which the third core network device is the same as the fourth core network device is used to describe the method provided in this embodiment of this application.

To better understand this application, the following describes some concepts mentioned in this application.

(1) Group

The group may be a terminal group, and one group may include at least two terminals. A terminal may belong to one or more groups.

(2) Group Identifier

The group identifier is used to identify a group, and the group may be in a one-to-one correspondence with the group identifier. For example, the group identifier may be a group name (group name).

(3) Group Context

The group context may be a context shared by all terminals in a group. For example, a group context of a group may include a common part of contexts of all terminals in the group. The group context corresponds to a group identifier. The group context corresponding to the group identifier may also be referred to as a group context of a group identified by the group identifier.

In an embodiment, the group context includes at least one of group subscription information, group policy information, and group access information, that is, includes one or more of group subscription information, group policy information, and group access information. For example, the group context may include the group subscription information, the group policy information, or the group access information, or may include the group subscription information and the group policy information, or may include the group subscription information and the group access information, or may include the group subscription information, the group policy information, and the group access information. This is not limited.

(4) Group Subscription Information

The group subscription information may include subscription information shared by all terminals in a group. The group subscription information may be used to manage subscription behaviors of all terminals in the group with a network. The group subscription information may include one or more of the following information: 1) a group identifier; 2) a subscribed periodic registration timer; 3) subscribed single network slice selection assistance information (S-NSSAI for short); 4) mobility restrictions; 5) a radio access technology (RAT for short)/frequency selection priority (RFSP for short) index; 6) a subscribed data network name (DNN for short) list; 7) an aggregate maximum bit rate (AMBR for short) parameter of a subscribed terminal; and 8) a list (UE list) of terminal identifiers in a group.

In the group subscription information, information other than (1) and (8) may be referred to as "shared data in subscription of the group".

(5) Group Policy Information

The group policy information may include policy information shared by all terminals in a group. The group policy information may be used to perform policy control on communication services of all terminals in the group. For example, the group policy information may include common access and mobility policy information, a group QoS parameter, and the like. The common access and mobility policy information may include an allowed tracking area identity (TAI for short) list, to identify tracking areas allowed to be used by all terminals in the group. The group QoS parameter is used to limit communication quality of all terminals in the group.

(6) Group Access Information

The group access information may include access management and mobility management information that can be shared by all terminals in a group. The group access information may be used to manage access behaviors of all terminals for a network in the group and mobility of all the terminals in the group. The group access information may be generated by a first core network device. The group access information may include one or more of the following information: a group security parameter (for example, a group key), a group paging parameter (for example, a group discontinuous reception (DRX for short) parameter, or a group paging radio capability parameter), and a group mobility management (MM for short) parameter (for example, a group registration periodicity, and a group registration area list). The group security parameter is used to ensure security of data and/or signaling of all the terminals in the group, the group paging parameter is used to limit behaviors of all terminals in a paging group on a network side, and the group MM parameter is used to manage mobility behaviors such as periodic registration and handover of all the terminals in the group. For example, the group key is used to encrypt and/or decrypt data of any terminal in the group. The group DRX parameter is used to control paging reception times of all the terminals in the group. The group paging radio capability parameter is used to enhance paging performed by an access network device on all the terminals in the group. The group registration periodicity is used to control periodic registration update behaviors of all the terminals in the group. The group registration area list is used to control mobility registration update behaviors of all the terminals in the group.

(7) Group Parameter

The group parameter may be a parameter included in group information. The group information may be group subscription information, group policy information, or group access information. For example, it is assumed that the group access information includes a group security parameter, a group paging parameter, and a group MM parameter, and the group parameter may be a group security parameter, a group paging parameter, or a group MM parameter, or may be a group security parameter, a group paging parameter, and a group MM parameter. This is not limited.

A context management method provided in the embodiments of this application may be applied to a scenario with a large quantity of terminals, for example, a scenario in which there are massive internet of things devices (massive internet of things, mIoT for short). This is not limited.

Figure 3:
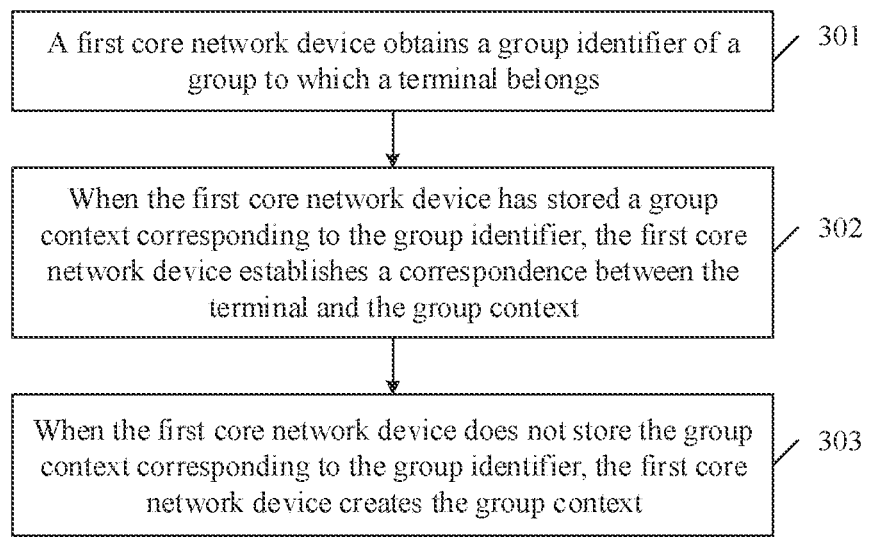
Figure 7A:
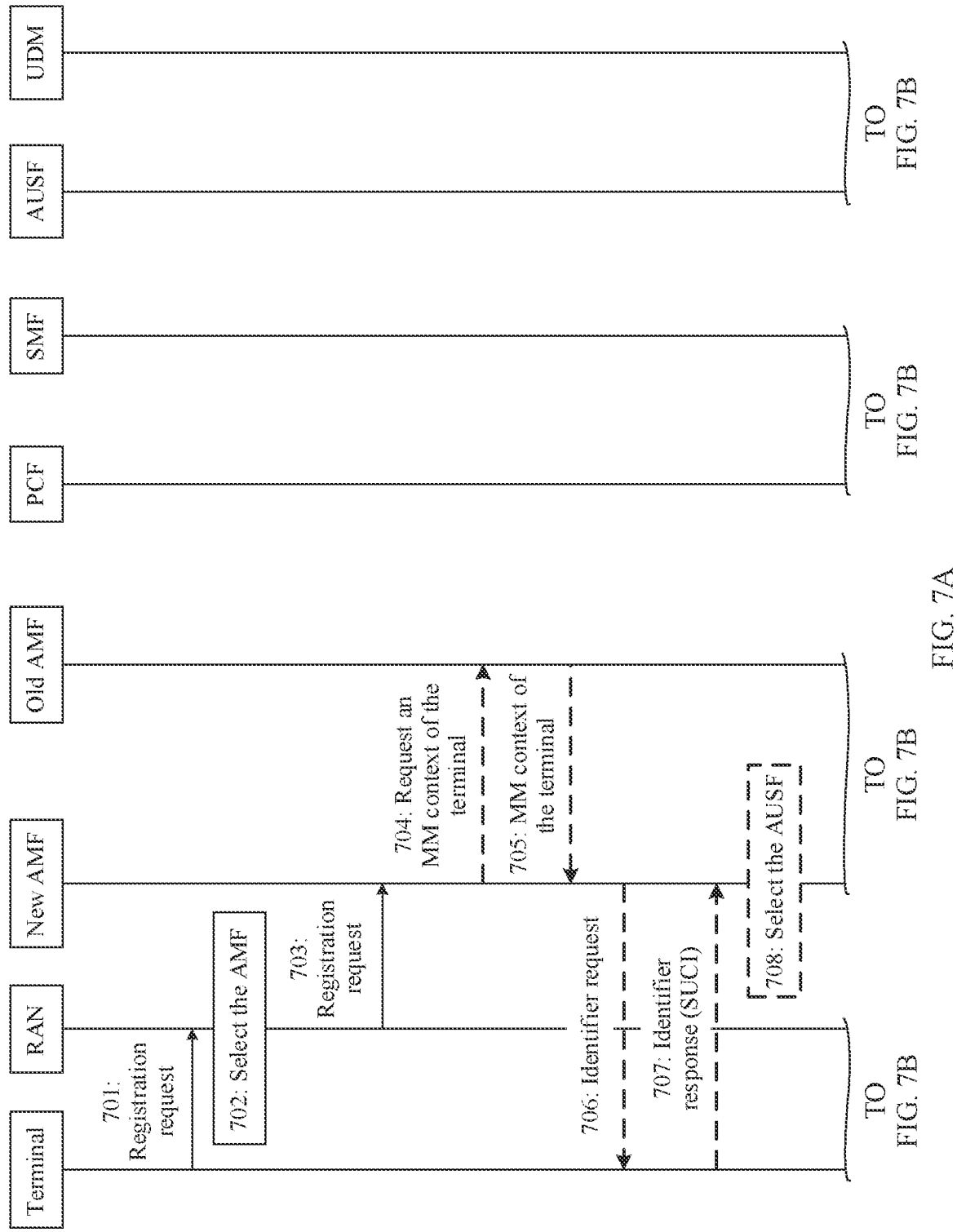
Figure 7B:
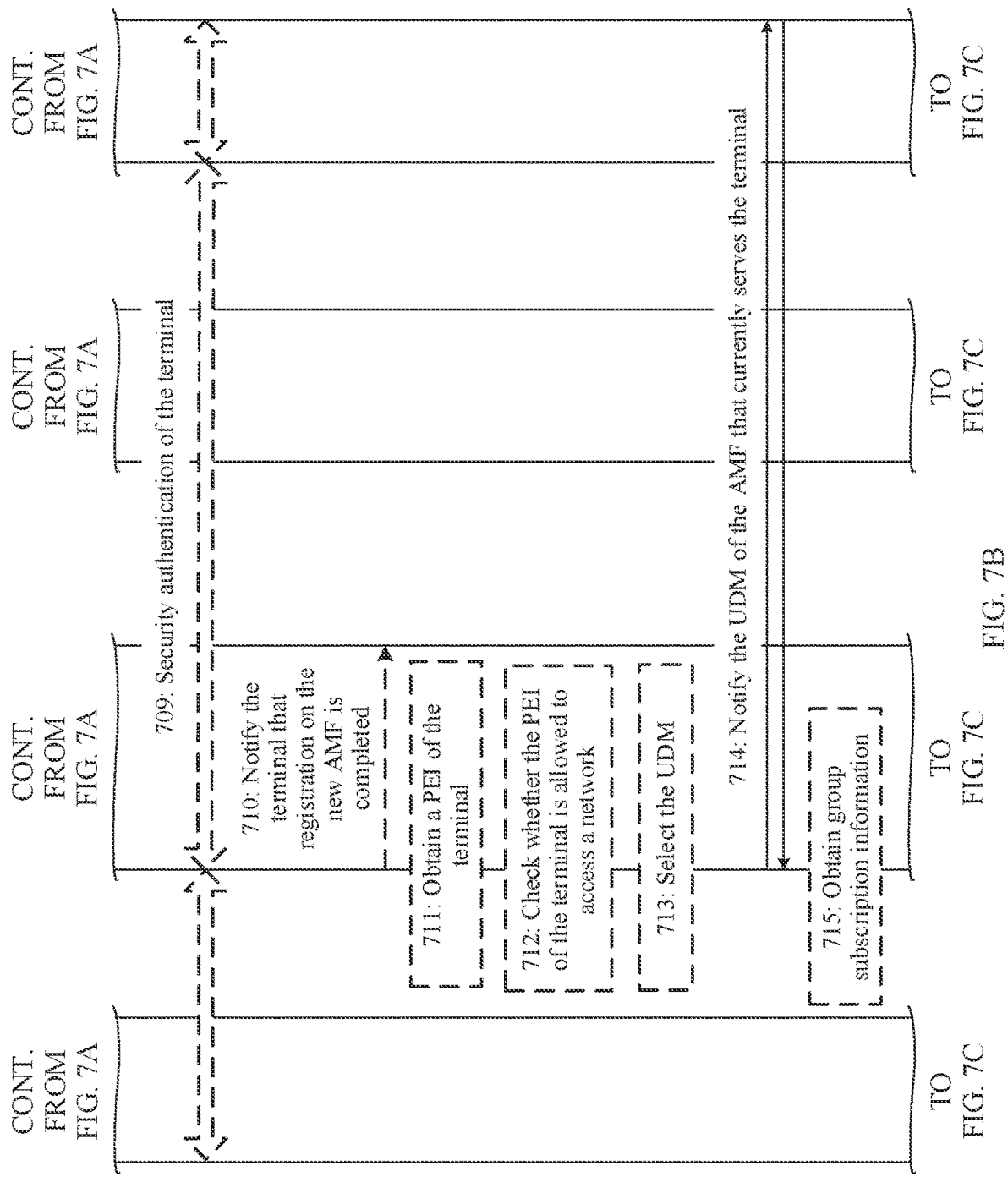
Figure 7C:
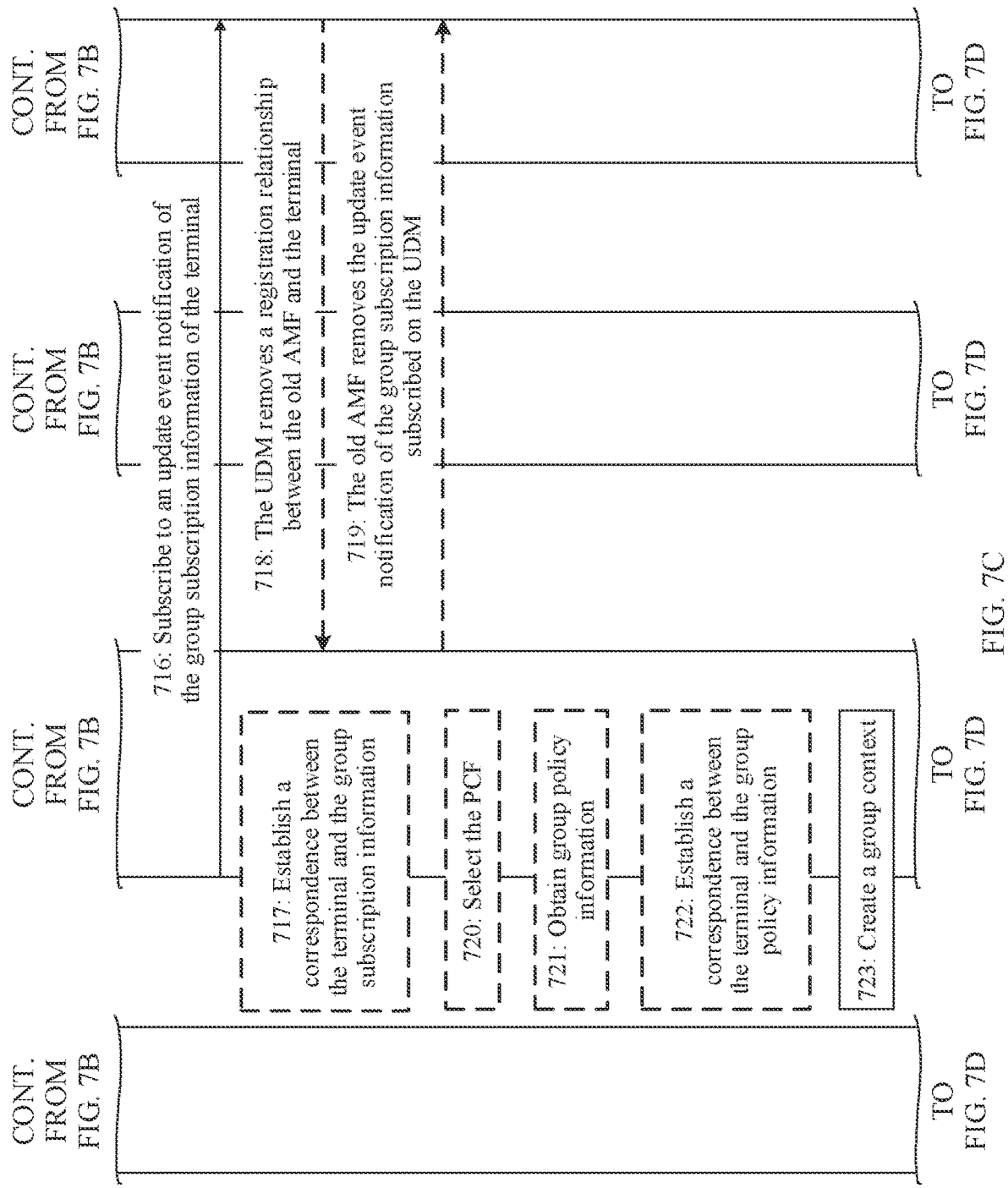

As shown in FIG. 3, an embodiment of this application provides a context management method. The method includes the following operations.

301: A first core network device obtains a group identifier of a group to which a terminal belongs.

In an example, the group identifier of the group to which the terminal belongs is configured in the first core network device. In this case, the first core network device may obtain, based on local configuration information, the group identifier of the group to which the terminal belongs.

In another example, the first core network device receives, from another device, the group identifier of the group to which the terminal belongs. In this case, operation 301 may be implemented in either of the following two manners during specific implementation.

Manner 1: The first core network device receives, from the terminal, the group identifier of the group to which the terminal belongs.

In an embodiment, the group identifier of the group to which the terminal belongs may be configured in the terminal, and the terminal may include the group identifier of the group to which the terminal belongs in a non-access stratum (non-access stratum, NAS for short) message and send the non-access stratum message to the first core network device through an access network device. For example, the NAS message may be a registration request (registration request) message.

Manner 2: The first core network device receives, from a fourth core network device, the group identifier of the group to which the terminal belongs.

In an embodiment, the group identifier of the group to which the terminal belongs may be configured in the fourth core network device as a part of subscription data of the terminal. For example, the group identifier of the group to which the terminal belongs is configured in a UDM. In this case, the first core network device may receive, from the UDM by invoking a subscription data obtaining (Nudm_SDM_Get) service provided by the UDM, the group identifier of the group to which the terminal belongs.

302: When the first core network device has stored a group context corresponding to the group identifier, the first core network device establishes a correspondence between the terminal and the group context.

In an embodiment of this application, the method may further include: creating a context of the terminal, where the context of the terminal includes only a private context of the terminal. The private context may be a context of the terminal other than the group context (which, for ease of description, is referred to as a group context of the terminal below) of the group to which the terminal belongs, and is, for example, a generic public subscription identifier (GPSI for short) or a permanent equipment identifier (PEI for short) associated with the terminal. Alternatively, the context of the terminal in the prior art includes two parts: One part is private information (that is, information different from that of other terminals in the group to which the terminal belongs) of the terminal, and the other part is common information (that is, information the same as that of the other terminals in the group to which the terminal belongs) of the terminal. According to methods provided in the embodiments of this application, the private information of the terminal is used as the context of the terminal, and the common information of the terminal is used as the group context of the terminal. It should be noted that a device or an entity may store a group context, and terminals in a group to which the terminal belongs share the group context. The group context is used, so that storage space is greatly saved and space utilization is improved.

In operation 302, the first core network device may establish the correspondence between the terminal and the group context by establishing a correspondence between the identifier of the terminal and the group identifier or the group context. The correspondence is used by the first core network device to find the group context of the terminal based on the identifier of the terminal. The "correspondence" in an embodiment of this application may also be described as an "association relationship" or a "mapping relationship".

The identifier of the terminal may be a subscription permanent identifier (SUPI for short) or a 5G globally unique temporary identifier (5G-GUTI for short) of the terminal, or may be a temporary identifier of the terminal. This is not limited.

In an example, the first core network device stores a correspondence between the group identifier and the group context. In this case, the first core network device may establish the correspondence between the identifier of the terminal and the group identifier. For example, the group identifier of the group to which the terminal belongs is stored in the context of the terminal. For another example, an address of the group context of the group to which the terminal belongs is stored in the context of the terminal. This is not limited.

In another example, before operation 302, for a correspondence that is among the group identifier, the group context, and the terminal in the group and that is stored on the first core network device, refer to Table 1. If the first core network device obtains a group identifier G3 of a group to which a terminal 8 belongs in operation 301, after operation 302 (that is, after the first core network device establishes a correspondence between the terminal 8 and a group context corresponding to G3), for the correspondence that is among the group identifier, the group context, and the terminal in the group and that is stored on the first core network device, refer to Table 2.

TABLE 1

| Terminal included in a group | Group identifier of the group | Group context |
|---|---|---|
| Terminal 1, terminal 3, and terminal 4 | G1 | Group context 1 |
| Terminal 2, terminal 5, and terminal 7 | G2 | Group context 2 |
| Terminal 6 | G3 | Group context 3 |

TABLE 2

| Terminal included in a group | Group identifier of the group | Group context |
|---|---|---|
| Terminal 1, terminal 3, and terminal 4 | G1 | Group context 1 |
| Terminal 2, terminal 5, and terminal 7 | G2 | Group context 2 |
| Terminal 6, and terminal 8 | G3 | Group context 3 |

It should be noted that in the tables shown in this embodiment of this application, the group context 1 includes group subscription information 1, group policy information 1, and group access information 1. The group context 2 includes group subscription information 2, group policy information 2, and group access information 2. The group context 3 includes group subscription information 3, group policy information 3, and group access information 3. A group context 4 mentioned below includes group subscription information 4, group policy information 4, and group access information 4. This is described herein in a unified manner, and details are not described in the following again.

Alternatively, operation 302 may be as follows: When the first core network device has stored the group context corresponding to the group identifier, the first core network device creates the private context of the terminal.

303: When the first core network device does not store the group context corresponding to the group identifier, the first core network device creates the group context.

During specific implementation of operation 303, the first core network device may obtain each piece of group information in the group context (the group context may include one or more pieces of group information), and then store each obtained piece of group information in the group context, to create the group context.

The following describes a process in which the first core network device creates the group context when the group context includes different group information by using an example.

Case 1: The group context includes at least group policy information.

The process in which the first core network device creates the group context includes at least: (11) A second core network device sends the group policy information to the first core network device. (12) The first core network device receives the group policy information from the second core network device. (13) The first core network device stores the group policy information in the group context.

Case 2: The group context includes at least group subscription information.

The process in which the first core network device creates the group context includes at least: (21) The first core network device receives the group subscription information from a third core network device. (22) The first core network device stores the group subscription information in the group context.

Case 3: The group context includes at least group access information.

The process in which the first core network device creates the group context includes at least: (31) The first core network device generates group access information. (32) The first core network device stores the group access information in the group context.

It may be understood that, when the group context includes group information described in different cases, the processes of creating the group context in the foregoing different cases may be combined to determine the process of creating the group context. For example, when the group context includes the group policy information and the group subscription information, the process in which the first core network device creates the group context includes (11) to (13) and (21) to (22).

In the Case 1:

The second core network device may store a correspondence between the group identifier and the group policy information. Before operation (11), the first core network device may further send the group identifier to the second core network device, and the second core network device sends, based on the group identifier, the group policy information corresponding to the group identifier to the first core network device.

For example, for the correspondence between the group identifier and the group policy information in the second core network device, refer to Table 3. If the group identifier received by the second core network device in operation 301 is G4, during specific implementation, in operation (11), the second core network device sends the group policy information 4 corresponding to G4 to the first core network device.

TABLE 3

| Group identifier of a group | Group policy information |
| --- | --- |
| G1 | Group policy information 1 |
| G2 | Group policy information 2 |
| G3 | Group policy information 3 |
| G4 | Group policy information 4 |

In the Case 2:

For example, during specific implementation, in operation (21), the first core network device may receive the group subscription information from the third core network device by invoking a Nudm_SDM_Get service.

Before operation (21), the first core network device may request the subscription data of the terminal from the third core network device, the third core network device receives, from the first core network device, a message for requesting the subscription data of the terminal, and the third core network device sends the subscription data of the terminal to the first core network device based on the message. The subscription data of the terminal may include the group subscription information.

The third core network device may store subscription data of each terminal. The subscription data of the terminal may include group subscription information (which, for ease of description, is referred to as group subscription information of the terminal below) of a group to which the terminal belongs, and may further include subscription information other than the group subscription information. Alternatively, the subscription data of the terminal includes the group subscription information (or referred to as common subscription information) of the terminal and private subscription information (that is, the subscription information other than the group subscription information) of the terminal.

In the Case 3:

The group access information in the group context may be generated by the first core network device. For example, if the group identifier obtained by the first core network device in operation 301 is G4, the first core network device generates the group access information 4.

The group access information may be obtained by the first core network device through calculation by using a preset algorithm.

In an embodiment, the group access information is obtained based on the group policy information and/or the group subscription information. Specifically, the group access information may be obtained by the first core network device based on the group policy information and/or the group subscription information.

For example, when the group access information includes a group key, the group key may be generated by the first core network device by using a key generation algorithm.

For example, when the group access information includes a group paging parameter (a group DRX parameter or a group paging radio capability parameter), the first core network device may determine the group paging parameter based on a paging parameter in the group subscription information and a preset paging parameter in the first core network device. For example, the first core network device may determine that a larger one of the paging parameter in the group subscription information and the preset paging parameter in the first core network device is the group paging parameter.

For example, when the group access information includes a group registration periodicity, the first core network device may determine the group registration periodicity based on a preset registration periodicity on the first core network device and a registration periodicity in the group subscription information (or the group policy information). For example, the first core network device may determine that a larger one of the preset registration periodicity on the first core network device and the registration periodicity in the group subscription information (or the group policy information) is the group registration periodicity.

For example, when the group access information includes a group registration area list, the first core network device may perform statistics collection based on registration area information obtained from all the terminals in the group, to determine the group registration area list. For example, if the registration area information reported by each of the terminals in the group includes information about registration areas A, B, and F, the first core network device may determine that the group registration area list includes the registration areas A, B, and F.

For example, before operation 303, for the correspondence that is among the group identifier, the group context, and the terminal in the group and that is stored on the first core network device, refer to Table 1. If the first core network device obtains the group identifier G4 of the group to which the terminal 8 belongs in operation 301, after operation 303 (that is, after the first core network device creates a group context corresponding to G4), for the correspondence that is among the group identifier, the group context, and the terminal in the group and that is stored on the first core network device, refer to Table 4.

TABLE 4

| Terminal included in a group | Group identifier of a group | Group context |
| --- | --- | --- |
| Terminal 1, terminal 3, and terminal 4 | G1 | Group context 1 |
| Terminal 2, terminal 5, and terminal 7 | G2 | Group context 2 |
| Terminal 6 | G3 | Group context 3 |
| Terminal 8 | G4 | Group context 4 |

The foregoing method may be performed in a process in which the terminal registers with a network. In the foregoing method, both operation 302 and operation 303 may be performed, or only one of operation 302 and operation 303 may be performed.

According to the method provided in this embodiment of this application, the first core network device may establish the correspondence between the terminal and the group context when the group context corresponding to the group identifier has been stored, so that the first core network device does not need to separately store one piece of content in the group context for the terminal, thereby saving storage space of the first core network device. Alternatively, the first core network device may create the group context when the first core network device does not store the group context corresponding to the group identifier, so that only one piece of content in the group context of the terminal in one group may be stored, and a plurality of pieces of the content do not need to be stored, thereby saving storage space of the first core network device.

It should be noted that whether the first core network device stores the group context of the terminal may be determined by using the following method:

Method 1: The first core network device may store a correspondence between the group context and the group identifier. When the first core network device obtains the identifier of the terminal, if the first core network device finds the group identifier from the correspondence, the first core network device determines that the group context is stored; otherwise, the first core network device determines that the group context is not stored.

Method 2: When the first core network device stores the group context, the first core network device further stores a terminal identifier list of the group, and the first core network device may obtain the identifier of the terminal, and determine whether the identifier of the terminal belongs to the terminal identifier list. When the identifier of the terminal belongs to the terminal identifier list, the first core network device stores the group context. When the identifier of the terminal does not belong to the terminal identifier list, the first core network device does not store the group context.

Optionally, in a first implementation scenario of the foregoing embodiment, after operation 302 and/or operation 303, the method further includes:

When the access network device of the terminal does not store a first parameter in the group context, the first core network device sends the identifier of the terminal, the group identifier, and the first parameter to the access network device. The first parameter may be a group security parameter, a group paging parameter, a group QoS parameter, or a group MM parameter.

For example, assuming that the first core network device stores identification information, and the identification information is used to indicate whether the first core network device has sent the first parameter in the group context to the access network device, the first core network device may determine, based on the identification information, whether the access network device of the terminal stores the first parameter in the group context. For example, a flag bit is stored. If the flag bit is set to 1, it indicates that the first core network device has sent the group security parameter to the access network device. If the flag bit is set to 0, it indicates that the first core network device does not send the group security parameter to the access network device. In this case, the first core network device may determine, based on the flag bit, whether the access network device stores the group security parameter.

The identifier of the terminal, the group identifier, and the first parameter may be used by the access network device to establish a correspondence between the terminal and the group context corresponding to the group identifier on the access network device. The identifier of the terminal, the group identifier, and the first parameter may be included in one message for sending, or may be included in a plurality of messages for sending. This is not limited in this embodiment of this application. For example, the identifier of the terminal, the group identifier, and the first parameter may be included in an N2 message (for example, an N2 PDU session request message, an N2 request message, or a paging message) for sending.

In addition, when the first core network device sends a plurality of parameters in the group context to the access network device, the plurality of parameters may be included in one message for sending, or may be included in a plurality of messages for sending.

It should be noted that a quantity of pieces of information included in the group context corresponding to the group identifier on the first core network device may be the same as or different from a quantity of pieces of information included in the group context corresponding to the group identifier on the access network device. For example, the group context corresponding to the group identifier on the first core network device may include 40 pieces of information, and the group context corresponding to the group identifier on the access network device may include five pieces of information in the 40 pieces of information. In this embodiment of this application, unless otherwise specified, the group context is the group context corresponding to the group identifier on the first core network device.

In the first implementation scenario, the method may further include: (41) The access network device receives, from the first core network device, the identifier of the terminal, the group identifier of the group to which the terminal belongs, and the information in the group context corresponding to the group identifier on the first core network device. (42) The access network device stores the information in the group context corresponding to the group identifier on the access network device, and establishes the correspondence between the terminal and the group context corresponding to the group identifier on the access network device.

The information that is in the group context corresponding to the group identifier on the first core network device and that is received by the access network device in operation (41) includes at least one of a group security parameter, a group paging parameter, a group QoS parameter, or a group MM parameter. For example, the information may be the first parameter or a plurality of parameters including the first parameter.

For example, based on the example shown in Table 1, for a correspondence among parameters, group identifiers, and terminals in groups that are included in group contexts corresponding to G1, G2, and G3 on the access network device, refer to Table 5. If the first parameter received by the access network device in operation (41) is the group paging parameter, the identifier of the terminal is an identifier of the terminal 5, and the group identifier is G2, after operation (42), for the correspondence among the parameters, group identifiers, and the terminals in the groups that are included in the group contexts corresponding to G1, G2, and G3 on the access network device, refer to Table 6.

TABLE 5

| Terminal included in a group | Group identifier of the group | Parameter included in a corresponding group context on the access network device |
|---|---|---|
| Terminal 3, and terminal 4 | G1 | Group security parameter |
| Terminal 2 | G2 | Group QoS parameter |
| Terminal 6 | G3 | Group QoS parameter and group MM parameter |

TABLE 6

| Terminal included in a group | Group identifier of the group | Parameter included in a corresponding group context on the access network device |
|---|---|---|
| Terminal 3, and terminal 4 | G1 | Group security parameter |
| Terminal 2, and terminal 5 | G2 | Group paging parameter and group QoS parameter |
| Terminal 6 | G3 | Group QoS parameter and group MM parameter |

Optionally, in a second implementation scenario of the foregoing embodiment, after operation 302 and/or operation 303, the method further includes:

When the access network device of the terminal has stored a second parameter in the group context, the first core network device sends the group identifier and the identifier of the terminal to the access network device. The second parameter may be a group security parameter, a group paging parameter, a group QoS parameter, or a group MM parameter.

The identifier of the terminal and the group identifier may be used by the access network device to establish the correspondence between the terminal and the group context that corresponds to the group identifier and that has been stored on the access network device. The identifier of the terminal and the group identifier may be included in one message for sending, or may be included in a plurality of messages for sending. This is not limited in this embodiment of this application. For example, the identifier of the terminal and the group identifier may be included in an N2 message (for example, an N2 PDU session request message, an N2 request message, or a paging message) for sending.

A method for determining, by the first core network device, whether the access network device stores the second parameter is similar to that for the first parameter, and details are not described again.

In the second implementation scenario, the method may further include: (51) The access network device receives, from the first core network device, the identifier of the terminal and the group identifier of the group to which the terminal belongs (for example, a group identifier corresponding to a group context that is of the terminal and that includes the second parameter). (52) The access network device establishes, based on the group identifier, a correspondence between the terminal and the group context that corresponds to the group identifier and that has been stored on the access network device.

For example, based on the example shown in Table 1, for the correspondence among the parameters, the group identifiers, and the terminals in the groups that are included in the group contexts corresponding to G1, G2, and G3 on the access network device, refer to Table 7. If the identifier of the terminal received by the access network device in operation (51) is the identifier of the terminal 5, and the group identifier is G2, after operation (52), for the correspondence among the parameters, the group identifiers, and the terminals in groups that are included in the group contexts corresponding to G1, G2, and G3 on the access network device, refer to Table 8.

Based on Table 7 and Table 8, it may be understood that if the group identifier received by the access network device in operation (51) is the group identifier corresponding to the group context that includes the second parameter and that is of the terminal, the second parameter is the group QoS parameter.

TABLE 7

| Terminal included in a group | Group identifier of the group | Parameter included in a corresponding group context on the access network device |
|---|---|---|
| Terminal 3, and terminal 4 | G1 | Group security parameter |
| Terminal 2 | G2 | Group QoS parameter |
| Terminal 6 | G3 | Group QoS parameter and group MM parameter |

TABLE 8

| Terminal included in a group | Group identifier of the group | Parameter included in a corresponding group context on the access network device |
|---|---|---|
| Terminal 3, and terminal 4 | G1 | Group security parameter |
| Terminal 2, and terminal 5 | G2 | Group QoS parameter |
| Terminal 6 | G3 | Group QoS parameter and group MM parameter |

When the first core network device stores the group context, to adapt to a constantly changing network environment, the method may further include: updating, by the first core network device, the group context. The following describes the update of the group context by using an example.

In an embodiment, that the first core network device updates the group context includes the following operation.

(61) The first core network device receives group policy update information of the group, and updates the group policy information in the group context based on the group policy update information.

Alternatively, (62) the first core network device receives group subscription update information of the group, and updates the group subscription information in the group context based on the group subscription update information.

Alternatively, (63) the first core network device generates group access update information of the group, and updates the group access information in the group context based on the group access update information.

Further, when the first core network device updates the group policy information (or the group subscription information) in the group context, in addition to receiving the group policy update information (or the group subscription update information), the first core network device may further receive the group identifier, and determine, based on the group identifier, the group context that needs to be updated. The group policy update information (or the group subscription update information) and the group identifier may be included in a same message for transmission, or may be included in different messages for transmission. For example, the group policy update information and the group identifier may be transmitted by using an access mobility policy control update notification (Npcf_AMPolicyControl_UpdateNotify) service provided by a PCF. For example, the group subscription update information and the group identifier may be included in a subscription data notification (Nudm_SDM_Notification) service provided by the UDM for transmission.

In addition, when the first core network device updates the group policy information (or the group subscription information) in the group context, the first core network device may further receive indication information used to indicate to update the group policy information (or the group subscription information) in the group context, and the first core network device updates the group policy information (or the group subscription information) in the group context based on the indication information.

The indication information may be information in a message. In this case, the indication information, and the group policy update information (or the group subscription update information) and the group identifier may be sent in one message, or may be sent in different messages. Alternatively, the indication information may be indicated through a message (for example, a message type of the message). In this case, the group policy update information (or the group subscription update information) and the group identifier may be included in the message or may not be included in the message.

In operation (61), the first core network device may receive the group policy update information of the group from the second core network device. In this case, the method may further include: if the group policy information in the second core network device is updated, sending, by the second core network device, updated group policy information to the first core network device.

A case in which the group policy information in the second core network device is updated may be as follows: The second core network device receives update information of the group policy information, and updates the group policy information based on the update information. Specifically, the second core network device may receive the update information of the group policy information from the UDM or an AF.

In operation (62), the first core network device may receive the group subscription update information of the group from the third core network device. In this case, the method may further include: if the group subscription information in the third core network device is updated, sending, by the third core network device, updated group subscription information to the first core network device.

A case in which the group subscription information in the third core network device is updated may be as follows: The third core network device receives update information of the group subscription information, and updates the group subscription information based on the received update information. Alternatively, the third core network device periodically updates the group subscription information.

In operation (63), during specific implementation, the first core network device may be triggered by another network element (for example, the AF or the UDM) to update the group access information, or may determine to update the group access information. For example, the group access information may be periodically updated. In this case, a timer may be set for the group access information. Duration specified by the timer is a periodicity of updating the group access information. The first core network device updates the group access information when the timer expires.

In operation (63), during specific implementation, for example, when the group access information includes the group key, the first core network device may regenerate the group key at intervals by using the key generation algorithm. When the group access information includes the group paging parameter (the group DRX parameter or the group paging radio capability parameter), if the first core network device receives update information of a paging parameter in the group subscription information, the first core network device may re-determine the group paging parameter based on an updated paging parameter in the group subscription information and the preset paging parameter in the first core network device. When the group access information includes the group registration periodicity, in a possible implementation, if the first core network device receives update information of the registration periodicity in the group subscription information, the first core network device may determine the group registration periodicity based on the preset registration periodicity on the first core network device and an updated registration periodicity in the group subscription information. In another possible implementation, if the first core network device receives update information of a registration periodicity in the group policy information, the first core network device may determine the group registration periodicity based on the preset registration periodicity on the first core network device and an updated registration periodicity in the group policy information. When the group access information includes the group registration area list, the first core network device may perform statistics collection at intervals based on the registration area information obtained from all the terminals in the group, to determine the group registration area list.

It should be noted that, for the group context, when a parameter in the group context corresponding to the group identifier on the access network device is updated, update information of the parameter further needs to be sent to the access network device, so that the access network device updates the group context. Details are described below.

Optionally, if a third parameter in the group context is updated, the method further includes: sending, by the first core network device, update information of the third parameter in the group context to the access network device.

The third parameter may be a group security parameter, a group paging parameter, a group QoS parameter, or a group MM parameter.

During specific implementation of the optional method, the first core network device may further send the group identifier to the access network device, so that the access network device determines that the group context that needs to be updated is the group context corresponding to the group identifier on the access network device. For example, the update information of the third parameter and the group identifier may be included in a terminal context modification request (UE context modification request).

The first core network device may further send indication information to the access network device, and the indication information is used to indicate the access network device to update the group context corresponding to the group identifier on the access network device. The indication information may be information in a message. In this case, the indication information, and the update information of the third parameter and the group identifier may be sent in one message, or may be sent in different messages. Alternatively, the indication information may be indicated through a message (for example, a message type of the message). In this case, the update information of the third parameter and the group identifier may be included in the message or may not be included in the message.

After receiving the update information of the parameter, the access network device may update, based on the received update information of the parameter, the group context corresponding to the group identifier on the access network device. Details are described below.

Optionally, the method further includes: receiving, by the access network device, update information of any parameter in information (the information may be the information that is in the group context corresponding to the group identifier on the first core network device and that is received by the access network device in operation (41)) from the first core network device; and updating, by the access network device based on the update information, the group context corresponding to the group identifier on the access network device.

Alternatively, the operation in the optional method may be described as follows: The access network device receives, from the first core network device, update information of a fourth parameter in the group context that corresponds to the group identifier and that has been stored on the access network device; and the access network device updates, based on the update information, the group context that corresponds to the group identifier and that has been stored on the access network device.

The any parameter (or the fourth parameter) in the information may be a group security parameter, a group paging parameter, a group QoS parameter, or a group MM parameter. For example, the any parameter (or the fourth parameter) in the information may be the third parameter, or may be another parameter. That the access network device updates, based on the update information of the any parameter (or the fourth parameter) in the information, the group context corresponding to the group identifier on the access network device is updating the any parameter (or the fourth parameter) in the group context.

In addition, to fully use storage space of the access network device, the group context corresponding to the group identifier on the access network device may further be released. Details are described below.

Optionally, the method further includes: if RRC connection states of all terminals that access the access network device and that are in the group are all idle states, deleting, by the access network device, the group context that is of the group and that is stored on the access network device; or if RRC connection states of all terminals corresponding to the group context stored on the access network device are all idle states, deleting, by the access network device, the group context stored on the access network device; or if RRC connection states of all terminals in a group corresponding to the group identifier on the access network device are all idle states, deleting, by the access network device, the group context that is of the group and that is stored on the access network device.

It should be noted that the terminals in the group stored on the first core network device may access different access network devices. A quantity of terminals in the group corresponding to the group identifier on the access network device may be different from a quantity of terminals in a group corresponding to the group identifier on the first core network device.

For example, referring to Table 1 and Table 7, the terminals in the group corresponding to the group identifier on the first core network device may include the terminal 1 to the terminal 7, and the terminals in the group corresponding to the group identifier on the access network device may include the terminal 3, the terminal 4, the terminal 2, and the terminal 6.

When the RRC connection states of all the terminals that are in the group and that access the access network device are all the idle states, or when the RRC connection states of all the terminals corresponding to the group context stored on the access network device are all the idle states, or when the RRC connection states of all the terminals in the group corresponding to the group identifier on the access network device are all the idle states, it indicates that the access network device no longer needs to serve all the terminals. Therefore, the access network device may delete the group context, and release storage space of the access network device.

An embodiment of this application further provides a context management method. As shown in FIG. 4, the method includes the following operations.

401: When a first core network device has stored group information corresponding to a terminal, the first core network device establishes a correspondence between the terminal and the group information.

In an embodiment, the group information includes group subscription information, group policy information, or group access information. The group access information may include a group security parameter, a group paging parameter, and a group MM parameter. The group policy information may include a group QoS parameter. For example, when the group information is the group subscription information, the first core network device establishes a correspondence between the terminal and the group subscription information.

The first core network device may be an AMF. For details, refer to related descriptions in the embodiment shown in FIG. 3. Details are not described again.

It should be noted that for nouns or terms mentioned in the embodiments of this application, reference may be made to each other. This is not limited.

The group information may belong to a group context. In one case, after the first core network device establishes the correspondence between the terminal and all the group information in the group context, the first core network device also establishes a correspondence between the terminal and the group context. In another case, the correspondence between the terminal and the group information may be implemented by establishing a correspondence between the terminal and the group context. For example, the correspondence between the terminal and the group context is established, so that a correspondence between the terminal and each piece of the group information in the group context is established. This is not limited.

The group access information may be obtained by the first core network device through calculation by using a preset algorithm. For example, the group access information is obtained based on the group policy information and the group subscription information. Specifically, the group access information may be obtained by the first core network device based on the group policy information and the group subscription information. For a specific method for obtaining the group access information, refer to the descriptions of the corresponding part in the embodiment shown in FIG. 3. Details are not described again.

In an embodiment, the method further includes: determining, by the first core network device, whether the group information corresponding to the terminal has been stored. This may be implemented in the following two manners:

Manner a: The first core network device obtains a group identifier of a group to which the terminal belongs, and determines, based on the group identifier, whether the first core network device has stored the group information corresponding to the terminal.

For a method for obtaining, by the first core network device, the group identifier of the group to which the terminal belongs, refer to the descriptions related to operation 301 in the embodiment shown in FIG. 3.

It is assumed that different group information may be stored in different storage areas of the first core network device. A correspondence between the group identifier and the group information may be stored in a storage area corresponding to the group information. In the foregoing manner a, the first core network device may search the storage area corresponding to the group information for the group identifier to determine whether the group information corresponding to the terminal has been stored. When the group identifier is found, it is determined that the group information corresponding to the terminal is stored; otherwise, it is determined that the group information corresponding to the terminal is not stored.

For example, when the first core network device stores each group context shown in Table 1, referring to Table 9, the group subscription information, the group policy information, and the group access information may be respectively stored in a storage area 1, a storage area 2, and a storage area 3. For example, it is assumed that the group information is the group policy information. In the manner a, the group identifier obtained by the first core network device is G2. If the first core network device finds G2 in the storage area 2, the first core network device determines that the group policy information corresponding to the terminal is stored.

has stored the group information corresponding to the terminal.

The first core network device may receive the identifier of the terminal from the terminal. The identifier of the terminal may be included in a NAS message. The NAS message may be a registration request message.

For example, a correspondence between a terminal identifier list in the group and the group information may be stored in the storage area corresponding to the group information. In the manner b, the first core network device obtains the identifier of the terminal. If the first core network device finds the identifier of the terminal in the terminal identifier list stored in the storage area corresponding to the group information, it is determined that the group information corresponding to the terminal has been stored; otherwise, it is determined that the group information corresponding to the terminal is not stored.

For example, when the first core network device stores the group contexts shown in Table 1, a terminal identifier list in a group corresponding to the group context 1 is a terminal identifier list 1. A terminal identifier list in a group corresponding to the group context 2 is a terminal identifier list 2. A terminal identifier list in a group corresponding to the group context 3 is a terminal identifier list 3. Referring to Table 10, the group subscription information, the group policy information, and the group access information may be respectively stored in the storage area 1, the storage area 2, and the storage area 3. For example, it is assumed that the group information is the group policy information, and the terminal is a terminal in a group corresponding to the group context 2. In the manner b, if the first core network device finds the identifier of the terminal in the terminal identifier

TABLE 9

| Storage area 1 | | Storage area 2 | | Storage area 3 | |
| --- | --- | --- | --- | --- | --- |
| Group subscription information | Group identifier | Group policy information | Group identifier | Group access information | Group identifier |
| Group subscription information 1 | G1 | Group policy information 1 | G1 | Group access information 1 | G1 |
| Group subscription information 2 | G2 | Group policy information 2 | G2 | Group access information 2 | G2 |
| Group subscription information 3 | G3 | Group policy information 3 | G3 | Group access information 3 | G3 |

Manner b: The first core network device obtains an identifier of the terminal, and determines, based on the identifier of the terminal, that the first core network device list 2 stored in the storage area 2, the first core network device determines that the group policy information corresponding to the terminal has been stored.

TABLE 10

| Storage area 1 | | Storage area 2 | | Storage area 3 | |
| --- | --- | --- | --- | --- | --- |
| Group subscription information | Terminal identifier list | Group policy information | Terminal identifier list | Group access information | Terminal identifier list |
| Group subscription information 1 | Terminal identifier list 1 | Group policy information 1 | Terminal identifier list 1 | Group access information 1 | Terminal identifier list 1 |
| Group subscription information 2 | Terminal identifier list 2 | Group policy information 2 | Terminal identifier list 2 | Group access information 2 | Terminal identifier list 2 |
| Group subscription information 3 | Terminal identifier list 3 | Group policy information 3 | Terminal identifier list 3 | Group access information 3 | Terminal identifier list 3 |

It should be noted that the method provided in this embodiment may be executed in a process in which the terminal registers with a network.

According to the method provided in this embodiment of this application, the first core network device may establish the correspondence between the terminal and the group information when the group information has been stored, so that the first core network device does not need to separately store one piece of the group information for the terminal, thereby saving storage space of the first core network device.

Optionally, in a first implementation scenario of the foregoing embodiment, the method further includes:

when an access network device accessed by the terminal does not store a first parameter in the group information, sending, by the first core network device, the identifier of the terminal and the first parameter to the access network device.

The first parameter is a group security parameter, a group paging parameter, a group QoS parameter, or a group MM parameter.

In an embodiment, the method further includes: determining, by the first core network device, whether the access network device stores the first parameter. For an implementation method, refer to the descriptions of the corresponding part in the embodiment shown in FIG. 3. A difference only lies in that the first parameter herein is the first parameter in the group information.

The identifier of the terminal and the first parameter may be used by the access network device to create the group context. The identifier of the terminal and the first parameter may be included in one message for sending, or may be included in a plurality of messages for sending. This is not limited. For example, the identifier of the terminal and the first parameter may be included in an N2 message (for example, an N2 PDU session request message, an N2 request message, or a paging message) for sending.

With reference to the first implementation scenario, the method may further include the following operations.

(71) The access network device receives the identifier of the terminal and a group parameter of the terminal from the first core network device.

(72) The access network device creates, based on the group parameter, a group context of the group to which the terminal belongs on the access network device.

The group parameter includes at least one of a group security parameter, a group paging parameter, a group QoS parameter, and a group MM parameter. For example, the group parameter may be the first parameter, or may include a plurality of different first parameters.

In one case, the access network device may store a correspondence between the group identifier and the group context of the group on the access network device. In this case, the access network device may further receive the group identifier from the first core network device, and determine, based on the group identifier, the group context that needs to be created and that is on the access network device. In another case, the access network device may store a correspondence between the terminal identifier list in the group and the group context of the group on the access network device. In this case, the access network device may further receive the identifier of the terminal from the first core network device, and determine, based on the identifier of the terminal, the group context that needs to be created and that is on the access network device.

The terminal identifier list may be sent by the first core network device to the access network device.

Operation (72) may include: storing, by the access network device, the group parameter in the group context of the access network device. For example, before operation (72), the group context of the group to which the terminal belongs on the access network device includes a group security parameter and a group paging parameter. In operation (72), the access network device stores the received first parameter in the group context. For example, the first parameter is the group QoS parameter. After operation (72), the group context of the group on the access network device includes a group security parameter, a group paging parameter, and a group QoS parameter.

Optionally, in a second implementation scenario of the foregoing embodiment, the method further includes: when the access network device accessed by the terminal has stored the second parameter in the group information, sending, by the first core network device, the identifier of the terminal to the access network device.

The second parameter is a group security parameter, a group paging parameter, a group QoS parameter, or a group MM parameter.

The identifier of the terminal may be used by the access network device to establish the correspondence between the terminal and the group context that is of the group to which the terminal belongs and that has been stored on the access network device. For example, the identifier of the terminal may be included in an N2 message (for example, an N2 PDU session request message, an N2 request message, or a paging message) for sending.

In an embodiment, the method further includes: determining, by the first core network device, whether the access network device stores the second parameter. An implementation method thereof is similar to that for the first parameter, and details are not described again.

With reference to the second implementation scenario, the method may further include the following operations.

(81) The access network device receives the identifier of the terminal from the first core network device.

(82) The access network device establishes, based on the identifier of the terminal, the correspondence between the terminal and the group context that is of the group to which the terminal belongs and that has been stored on the access network device.

In one case, the access network device may store the correspondence between the group identifier and the group context of the group on the access network device. In this case, the access network device may further receive the group identifier from the first core network device, and determine, based on the group identifier, the group context corresponding to the terminal on the access network device. In another case, the access network device may store the correspondence between the terminal identifier list in the group and the group context of the group on the access network device. In this case, the access network device may further receive the identifier of the terminal from the first core network device, and determine, based on the identifier of the terminal, the group context corresponding to the terminal on the access network device.

In a third implementation scenario of the foregoing embodiment, the method may further include: updating, by the first core network device, the group information, to adapt to a constantly changing network environment.

In an embodiment, that the first core network device updates the group information includes the following operation.

(91) When the group information is the group policy information or the group subscription information, the first core network device receives update information of the group information, and updates the group information based on the update information of the group information.

Alternatively, (92) when the group information is the group access information, the first core network device generates update information of the group information, and updates the group information based on the update information of the group information.

In an example implementation, the correspondence between the group identifier and the group information is stored in the storage area corresponding to the group information. If the group information is the group policy information or the group subscription information, the first core network device may receive the group identifier in addition to the update information of the group information. The first core network device determines, based on the group identifier, the group information that needs to be updated.

In another example implementation, the correspondence between the terminal identifier list in the group and the group information is stored in the storage area corresponding to the group information. If the group information is the group policy information or the group subscription information, the first core network device may receive the identifier of the terminal in addition to the update information of the group information. The first core network device determines, based on the identifier of the terminal, the group information that needs to be updated.

The update information of the group information and the group identifier (or the identifier of the terminal) may be included in a same message and transmitted to the first core network device, or may be included in different messages and transmitted to the first core network device. For example, update information of the group policy information and the group identifier (or the identifier of the terminal) may be transmitted by using an access mobility policy control update notification (Npcf_AMPolicyControl_UpdateNotify) service provided by a PCF. The update information of the group subscription information and the group identifier (or the identifier of the terminal) may be included in a subscription data notification (Nudm_SDM_Notification) service provided by a UDM for transmission.

In an embodiment, the method further includes: receiving, by the first core network device, indication information used to indicate to update the group information, and updating, by the first core network device, the group information based on the indication information.

The indication information may be an information element or a bit in an information element in a message. The indication information, and the update information of the group information and the group identifier (or the identifier of the terminal) may be carried in a same message for sending, or may be carried in different messages for sending. Alternatively, the indication information may be a message (for example, a message name), and the update information of the group information and the group identifier (or the identifier of the terminal) may be included in a message used as the indication information, or may not be included in a message used as the indication information.

In operation (91), for a process in which the first core network device obtains the group policy information or the group subscription information, a case in which the group policy information in the second core network device is updated, and a case in which group subscription information in a third core network device is updated, refer to descriptions of the corresponding part in the embodiment shown in FIG. 3. Details are not described again. For a specific implementation of operation (92), refer to the related descriptions of operation (63) in the embodiment shown in FIG. 3.

It should be noted that when in the group information, the group parameter in the group context stored on the access network device is updated, update information of the group parameter may further be sent to the access network device, so that the access network device updates the group context stored on the access network device. Details are described below.

In an embodiment, if a third parameter in the group information is updated, the method further includes: sending, by the first core network device, update information of the third parameter in the group information to the access network device.

The third parameter is a group security parameter, a group paging parameter, a group QoS parameter, or a group MM parameter.

It should be noted that when the access network device stores the correspondence between the group identifier and the group context of the group on the access network device, the first core network device may further send the group identifier to the access network device, and the access network device may determine, based on the group identifier, the group context that needs to be updated and that is on the access network device. When the access network device stores the correspondence between the terminal identifier list in the group and the group context of the group on the access network device, the first core network device may further send the identifier of the terminal to the access network device, and the access network device may determine, based on the identifier of the terminal, the group context that needs to be updated and that is on the access network device.

For example, the update information of the third parameter and the group identifier (or the identifier of the terminal) may be included in a terminal context modification request (UE context modification request).

In an embodiment, the method further includes: sending, by the first core network device, indication information to the access network device, where the indication information is used to indicate the access network device to update the corresponding group context stored on the access network device.

The indication information may be information in a message. In this case, the indication information, and the update information of the third parameter and the group identifier (or the identifier of the terminal) may be sent in one message, or may be sent in different messages. Alternatively, the indication information may be indicated through a message (for example, a message type of the message). In this case, the update information of the third parameter and the group identifier (or the identifier of the terminal) may be included in the message or may not be included in the message.

After receiving the update information of the group parameter, the access network device may update, based on the received update information of the group parameter, the group context stored on the access network device. Details are described below.

In an embodiment, the method further includes the following operations.

(101) The access network device receives update information of any parameter in the group parameter from the first core network device.

(102) The access network device updates, based on the update information, the group context stored on the access network device.

Alternatively, the operation in the optional method may be described as follows: The access network device receives, from the first core network device, update information of a fourth parameter in the group context that is stored on the access network device; the access network device updates, based on the update information, the group context that has been stored on the access network device.

The any parameter (or the fourth parameter) in the group parameter may be a group security parameter, a group paging parameter, a group QoS parameter, or a group MM parameter. For example, the any parameter (or the fourth parameter) in the group parameter may be the third parameter, or may be another parameter. The access network device updates, based on the any parameter (or the fourth parameter) in the group parameter, the group context stored on the access network device.

In addition, to fully use storage space on the access network device, the group context stored on the access network device may further be released. For descriptions of this part, refer to the descriptions of the corresponding part in the embodiment shown in FIG. 3.

An embodiment of this application further provides a context management method. As shown in FIG. 5, the method includes the following operations.

501: When a first core network device does not store group information corresponding to a terminal, the first core network device obtains the group information.

In an embodiment, the method further includes: determining, by the first core network device, whether the group information is stored. For an implementation method of the method, refer to the descriptions of the corresponding part in the embodiment shown in FIG. 4. Details are not described again.

The following describes an example of a process in which the first core network device obtains the group information when the group information is different information.

Case (1): The group information is group subscription information.

In the case (1), the process in which the first core network device obtains the group information includes: receiving, by the first core network device, the group subscription information from the third core network device. Refer to the descriptions of the corresponding part in the embodiment shown in FIG. 3. Details are not described again.

The third core network device may be a PCF. The group subscription information may include a group identifier and/or a terminal identifier list in a group. In the first core network device, a correspondence between the group identifier (or the terminal identifier list in the group) in the group and the group information is stored in a storage area corresponding to the group information.

Case (2): The group information is group policy information.

In the case (2), the process in which the first core network device obtains the group information includes: receiving, by the first core network device, the group policy information from a second core network device. The second core network device may be a UDM.

Case (3): The group information is group access information.

The process in which the first core network device obtains the group information includes: generating, by the first core network device, the group access information. Refer to the descriptions of the corresponding part in the embodiment shown in FIG. 3. Details are not described again.

In the case (2):

In one case, the second core network device may store a correspondence between the group identifier and the group policy information. Before the second core network device sends the group policy information to the first core network device, the first core network device may further send the group identifier to the second core network device, and the second core network device sends, based on the group identifier, the group policy information corresponding to the group identifier to the first core network device.

In another case, the second core network device may store a correspondence between the terminal identifier list in the group and the group policy information. Before the second core network device sends the group policy information to the first core network device, the first core network device may further send the identifier of the terminal to the second core network device, and the second core network device sends, based on the identifier of the terminal, the group policy information corresponding to the identifier of the terminal to the first core network device.

502: The first core network device creates a group context based on the group information, where the group context includes the group information.

That the first core network device creates the group context based on the group information in operation 502 may include: storing, by the first core network device, the group information in the group context.

It should be noted that when the group context includes different group information (for example, including the group policy information, the group subscription information, and the group access information), the first core network device may create the group context after obtaining all the group information in the group context. For example, when the first core network device stores some group information included in the group context, the first core network device may create the group context after obtaining group information, other than the group information, in the group context. Definitely, the first core network device may alternatively create a group context once each time after obtaining one piece of group information, for example, store the obtained group information in the group context.

It should be noted that for nouns such as the group information, the first core network device, the third core network device, the group identifier, and the identifier of the terminal, refer to the descriptions of the corresponding parts in the foregoing embodiments. Details are not described again.

According to the method provided in this embodiment of this application, when the first core network device does not store the group information, the first core network device creates the group context based on the group information, so that the first core network device may store only one piece of the group information, and does not need to store one piece of the group information for each terminal in one group, thereby saving storage space of the first core network device.

Optionally, this embodiment further includes a method in the first implementation scenario and/or the second implementation scenario in the embodiment shown in FIG. 4. For related descriptions, refer to the descriptions of the corresponding part in the embodiment shown in FIG. 4. Details are not described again.

In an embodiment, the method further includes: updating, by the first core network device, the group information, to adapt to a constantly changing network environment. For a process of updating the group information, refer to the descriptions of the corresponding part in the embodiment shown in FIG. 4. Details are not described again.

When in the group information, the group parameter in the group context stored on the access network device is updated, the method may further include: sending, by the first core network device, update information of the group parameter to the access network device, so that the access network device updates the group context. For the process, refer to the descriptions of the corresponding part in the embodiment shown in FIG. 4. Details are not described again.

Correspondingly, after receiving the update information of the group parameter, the access network device may update, based on the received update information of the group parameter, the group context stored on the access network device. For the process, refer to the descriptions of the corresponding part in the embodiment shown in FIG. 4. Details are not described again.

In addition, to fully use storage space on the access network device, the method may further include: releasing, by the access network device, the group context stored on the access network device. For descriptions of this part, refer to the descriptions of the corresponding part in the embodiment shown in FIG. 3.

An embodiment of this application further provides a context management method. As shown in FIG. 6, the method includes the following operations.

601: A first core network device obtains group access information based on group policy information and group subscription information.

The group access information may include at least one of a group security parameter, a group paging parameter, and a group MM parameter. For example, the group access information includes one of the group security parameter, the group paging parameter, and the group MM parameter, or the group paging parameter and the group MM parameter, or the group security parameter and the group paging parameter, or the group security parameter, the group paging parameter, and the group MM parameter. This is not limited.

For a method for obtaining the group access information, refer to the descriptions of the corresponding part in the embodiment shown in FIG. 3. Details are not described again.

602: The first core network device creates a group context based on the group access information, where the group context includes the group access information.

Operation 602 may include: storing, by the first core network device, the group access information in the group context.

For example, when the group context includes different group information (for example, including the group policy information, the group subscription information, and the group access information), the first core network device may create the group context after obtaining all the group information in the group context. For example, when the first core network device stores some group information included in the group context, the first core network device may create the group context after obtaining group information, other than the group information, in the group context. The first core network device may alternatively create a group context once each time after obtaining one piece of group information, for example, store the obtained group information in the group context.

According to the method provided in this embodiment of this application, the first core network device may further obtain the group access information, and create the group context based on the group access information, so that only one piece of the group access information may be stored, and one piece of the group access information does not need to be stored for each terminal in one group, thereby saving storage space of the first core network device.

In addition, this embodiment may further include a method in the first implementation scenario and/or the second implementation scenario in the embodiment shown in FIG. 4. For related descriptions, refer to the descriptions of the corresponding part in the embodiment shown in FIG. 4. Details are not described again.

For the group information stored on the first core network device, to adapt to a constantly changing network environment, the method may further include: updating, by the first core network device, the group access information.

That the first core network device updates the group access information may include:

receiving, by the first core network device, group policy update information, obtaining group access update information based on the group policy update information, and updating the group access information in the group context based on the group access update information; or receiving, by the first core network device, group subscription update information, obtaining group access update information based on the group subscription update information, and updating the group access information in the group context based on the group access update information; or generating, by the first core network device, group access update information and updating the group access information in the group context based on the group access update information.

It should be noted that different group information may be stored in different storage areas of the first core network device. A correspondence between a group identifier (or a terminal identifier list in a group) and the group information may be stored in a storage area corresponding to the group information. For descriptions of content related to this part, refer to the descriptions of the corresponding part in the embodiment shown in FIG. 4. Details are not described again.

In this case, when the first core network device updates the group information (the group policy information or the group subscription information) in the group context, in addition to receiving update information of the group information, the first core network device may further receive the group identifier, and determine, based on the group identifier, the group context that needs to be updated. Alternatively, in addition to receiving update information of the group information, the first core network device may further receive an identifier of the terminal, and determine, based on the identifier of the terminal, the group context that needs to be updated.

The group information and the group identifier (or the identifier of the terminal) may be included in a same message for transmission, or may be included in different messages for transmission. For example, the group policy update information and the group identifier (or the identifier of the terminal) may be transmitted by using an access mobility policy control update notification (Npcf_AMPolicyControl_UpdateNotify) service provided by a PCF. The group subscription update information and the group identifier (or the identifier of the terminal) may be included in a subscription data notification (Nudm_SDM_Notification) service provided by a UDM for transmission.

For generation of the group access update information by the first core network device, refer to the descriptions of the corresponding part in the embodiment shown in FIG. 3. Details are not described again.

In an embodiment, when in the group information stored on the first core network device, the group parameter (for example, the group MM parameter in the group access information) in the group context stored on the access network device is updated, the method further includes: sending, by the first core network device, update information of the group parameter to the access network device, so that the access network device updates the group context. For the process, refer to the descriptions of the corresponding part in the embodiment shown in FIG. 4. Details are not described again.

Correspondingly, after receiving the update information of the group parameter (for example, the group MM parameter in the group access information), the access network device may update, based on the received update information of the group parameter, the group context stored on the access network device. For the process, refer to the descriptions of the corresponding part in the embodiment shown in FIG. 4. Details are not described again.

In addition, to fully use storage space on the access network device, the method may further include: releasing, by the access network device, the group context stored on the access network device. For descriptions of this part, refer to the descriptions of the corresponding part in the embodiment shown in FIG. 3. Details are not described again.

An embodiment of this application further provides a context management method, including: when a first core network device has stored group information corresponding to a terminal, establishing, by the first core network device, a correspondence between the terminal and the group information; and when the first core network device does not store the group information corresponding to the terminal, obtaining, by the first core network device, the group information, and creating a group context, where the group context includes the group information, and the terminal corresponds to each piece of group information in the group context. For specific implementation of each operation in the method, refer to the foregoing descriptions of the related part above. Details are not described again. In the method, when the first core network device does not store the group information corresponding to the terminal, the correspondence between the terminal and the group information is established by creating the group context.

According to the method, the correspondence between the terminal and the group information may be established when the first core network device has stored the group information, so that the first core network device does not need to separately store one piece of the group information for the terminal, thereby saving storage space of the first core network device. Alternatively, when the first core network device does not store the group information, the group context may be created based on the group information, so that the first core network device may store only one piece of the group information, and does not need to store one piece of the group information for each terminal in a group, thereby saving storage space of the first core network device.

An embodiment of this application further provides a context management method, including: when a first core network device has stored group policy information and group subscription information that correspond to a terminal, obtaining, by the first core network device, group access information based on the group policy information and the group subscription information; and creating, by the first core network device, the group context based on the group policy information, the group subscription information, and the group access information. For specific implementation of each operation in the method, refer to the foregoing descriptions of the related part above. Details are not described again.

In an embodiment, the group context may be created when the first core network device has stored the group policy information and the group subscription information. In this way, the first core network device does not need to separately store one piece of content in the group context for the terminal, thereby saving storage space of the first core network device. An embodiment of this application further provides a context management method, including: when a first core network device does not store group information corresponding to a terminal, obtaining, by the first core network device, the group information, where the group information is group policy information and/or group subscription information; obtaining, by the first core network device, group access information based on the group policy information and the group subscription information; and creating, by the first core network device, the group context based on the group policy information, the group subscription information, and the group access information. When the group information is the group policy information, the group subscription information may be information stored on the first core network device; or when the group information is the group subscription information, the group policy information may be information stored on the first core network device. For specific implementation of each operation in the method, refer to the foregoing descriptions of the related part above. Details are not described again.

In an embodiment, the first core network device may create the group context when the first core network device does not store the group information, so that only one piece of content in the group context of the terminal in one group may be stored, and a plurality of pieces of the content do not need to be stored, thereby saving storage space of the first core network device.

The following describes the foregoing method by using an example in which the group context includes the group subscription information, the group policy information, and the group access information. In Embodiment 1 to Embodiment 3, an example in which a first core network device is an AMF, a second core network device is a PCF, both a third core network device and a fourth core network device are UDMs, and an access network device is a RAN node is used. For ease of description, in Embodiments 1 to 3, the RAN node is referred to as a RAN for short. In other words, in the descriptions in Embodiments 1 to 3, the RAN refers to the RAN node. For explanations of content related to the foregoing embodiments in Embodiment 1 to Embodiment 3, refer to the foregoing related descriptions, and details are not described below again.

Embodiment 1

As shown in FIG. 7A to FIG. 7D (dashed-line operations in the figure are optional operations), the method provided in Embodiment 1 includes the following operations.

701: When a terminal registers with a network, the terminal sends a registration request message to a RAN.

The registration request message may include a registration management NAS (RM-NAS for short) parameter forwarded by the RAN to an AMF. The RM-NAS parameter may include an SUPI or a 5G-GUTI of the terminal. Optionally, the RM-NAS parameter may further include a permanent equipment identifier (PEI for short) of the terminal. The RM-NAS parameter may further include a group identifier. For example, when a group identifier of a group to which the terminal belongs is preconfigured on the terminal, the RM-NAS parameter may include the group identifier.

702: The RAN selects the AMF.

For example, in operation 702, the AMF selected by the RAN may be an old AMF (an AMF that stores all contexts (including a group context of the terminal and a context of the terminal) of the terminal), or may be a new AMF (an AMF that does not store all the contexts of the terminal). When the RAN selects the new AMF, operation 703 to operation 730 are performed. When the RAN selects the old AMF, for a method procedure, refer to a procedure in the prior art, for example, operation 3 to operation 23 in section 4.2.2.2.2 in the communications protocol TS23.502-f10.

703: The RAN sends the registration request message to the new AMF.

The registration request message may include the RM-NAS parameter.

704: The new AMF requests an MM context of the terminal from the old AMF.

For example, the new AMF invokes a terminal context transfer communication (Namf_Communication_UEContextTransfer) service provided by an AMF on the old AMF, to request the MM context of the terminal from the old AMF.

The MM context of the terminal is some of all the contexts of the terminal. The MM context of the terminal may include a group context of the group to which the terminal belongs. In addition, the MM context of the terminal may further include the PEI and the like of the terminal.

705: The old AMF sends the MM context of the terminal to the new AMF.

For example, the old AMF responds to invoking of the terminal context transfer communication service provided by the new AMF (Namf_Communication_UEContextTransfer Response). The response may include the MM context of the terminal.

It should be noted that, if the new AMF obtains the MM context of the terminal in operation 705, the new AMF stores the MM context of the terminal. Assuming that the MM context of the terminal includes the group context of the group to which the terminal belongs, the new AMF stores the group context of the terminal.

In an embodiment, the response further includes an SUPI of the terminal.

In an embodiment, if the RM-NAS parameter does not include the SUPI of the terminal, and the response in operation 705 does not include the SUPI of the terminal, operation 706 and operations after operation 706 are performed after operation 705. Otherwise, after operation 705, operation 708 and operations after operation 708 are performed.

706: The new AMF sends an identifier request (Identity Request) message to the terminal.

The identifier request message may be used to request a subscription encryption flag (subscription concealed identifier, SUCI for short) of the terminal.

707: The terminal sends an identifier response (Identity Response) message to the new AMF.

The identifier response message may include the SUCI of the terminal.

For example, after receiving the SUCI of the terminal, the new AMF may decrypt the SUPI of the terminal based on the SUCI of the terminal.

708: The new AMF selects an AUSF (AUSF selection).

The selected AUSF may be used to perform security authentication on the terminal.

709: The AUSF performs security authentication of the terminal.

For example, the AUSF may interact with a UDM, the new AMF, and the terminal to implement security authentication on the terminal.

If the AUSF successfully authenticates the terminal, operation 710 to operation 730 are performed. If the AUSF successfully authenticates the terminal, the procedure ends.

710: After the terminal completes registration with the new AMF, the new AMF notifies the old AMF that the terminal completes registration with the new AMF.

For example, the new AMF invokes a registration completion notification communication (Namf_Communication_RegistrationCompleteNotify) service provided by the AMF on the old AMF, to notify the old AMF that the terminal completes registration with the new AMF.

If the RM-NAS parameter does not include the PEI of the terminal, and the response in operation 705 does not include the PEI of the terminal, operation 711 and operations after operation 711 are performed after operation 710. Otherwise, after operation 710, operation 712 and operations after operation 712 are performed.

711: The new AMF obtains the PEI of the terminal.

For example, the new AMF sends an identifier request message to the terminal, where the identifier request message is used to request the PEI of the terminal. The terminal sends an identifier response message to the new AMF, where the identifier response message includes the PEI of the terminal.

712: The new AMF checks whether the PEI of the terminal is allowed to access a network.

For example, the new AMF invokes a 5G interface device identifier register device identifier check obtaining (N5geir_EquipmentIdentityCheck_Get) service to check whether the PEI of the terminal is allowed to access a network.

713: The new AMF selects the UDM (UDM selection).

The foregoing only briefly describes operation 701 to operation 713. Optionally, for detailed descriptions of operation 701 to operation 713, refer to operation 1 to operation 13 in section 4.2.2.2.2 in the communications protocol TS23.502-f10.

If the new AMF does not store group subscription information, after operation 713, operation 714 to operation 716, operation 718, and operations after operation 718 are performed. If the new AMF stores the group subscription information, after operation 713, operation 717 and operations after operation 717 or operation 718 and operations after operation 718 are performed.

"If the new AMF does not store group subscription information" may be replaced with "when the first terminal that initiates registration to the new AMF and that is in the group to which the terminal belongs performs registration and there is no group subscription data of the group on the new AMF". "If the new AMF stores the group subscription information" may be replaced with "when the second terminal or a terminal after the second terminal that initiates registration to the new AMF and that is in the group to which the terminal belongs performs registration and there is group subscription data of the group on the new AMF".

714: The new AMF notifies the UDM of an AMF that currently serves the terminal.

For example, the new AMF invokes a terminal connection management registration (Nudm_UECM_Registration) service provided by the UDM to register with the UDM, to notify the UDM of the AMF that currently serves the terminal.

715: The new AMF obtains the group subscription information.

For example, the new AMF obtains the group subscription information from the UDM. For example, the new AMF obtains subscription data of the terminal by invoking a subscription data obtaining (Nudm_SDM_Get) service provided by the UDM. The subscription data of the terminal includes the group subscription information of the group to which the terminal belongs.

The group subscription information may include a terminal identifier list and a group identifier in the group, and the group subscription information may further include other information (which may be referred to as common data in subscription of the group). For details, refer to the foregoing descriptions. Details are not described herein again.

716: The new AMF subscribes to an update event notification of the group subscription information of the terminal from the UDM.

For example, the new AMF subscribes to the update event notification of the group subscription information of the terminal by invoking a subscription data subscription (Nudm_SDM_Subscribe) service provided by the UDM (that is, when the group subscription information of the terminal on the UDM is updated, the UDM notifies the new AMF of the updated group subscription information).

Certainly, the subscription data subscription service provided by the UDM and invoked by the new AMF may further be used to subscribe to an update of private subscription data of the terminal from the UDM (that is, when the private subscription data of the terminal on the UDM is updated, the UDM notifies the new AMF of the updated private subscription data).

717: The new AMF establishes a correspondence between the terminal and the group subscription information.

718: The UDM removes a registration relationship between the old AMF and the terminal.

For example, the UDM invokes a terminal connection management deregistration notification (Nudm_UECM_DeregistrationNotification) service that is provided by the UDM and that is on the old AMF to remove a registration relationship between the old AMF and the terminal.

719: The old AMF unsubscribes from the update event notification of the group subscription information subscribed on the UDM.

For example, the old AMF invokes a subscription data unsubscription (Nudm_SDM_unsubscribe) service provided by the UDM to remove the update event notification of the group subscription information subscribed on the UDM.

720: The new AMF selects a PCF.

If the new AMF does not store group policy information, after operation 720, operation 721, operation 723, and operations after operation 723 are performed. If the new AMF stores the group policy information, after operation 720, operation 722 and operations after operation 722 or operation 723 and operations after operation 723 are performed.

"If the new AMF does not store group policy information" may be replaced with "when the first terminal that initiates registration to the new AMF and that is in the group to which the terminal belongs performs registration and there is no group access mobility policy on the new AMF". "If the new AMF stores the group policy information" may be replaced with "when the second terminal or a terminal after the second terminal that initiates registration to the new AMF and that is in the group to which the terminal belongs performs registration and there is a group access mobility policy on the new AMF".

721: The new AMF obtains the group policy information.

For example, the new AMF may interact with the PCF to obtain the group policy information of the terminal.

In an embodiment, operation 721 includes: invoking, by the new AMF, an access mobility policy control creation (Npcf_AMPolicyControl_Create) service provided by the PCF, sending the group identifier to the PCF, and the like. The PCF determines, based on the group identifier, whether the group policy information corresponding to the group identifier exists on the new AMF. If not, a response of the PCF to invoking of the service includes the group policy information.

For example, the PCF may maintain a correspondence between the new AMF and the group identifier corresponding to the group policy information that has been sent to the new AMF, and the PCF determines, based on the correspondence, whether the group policy information corresponding to the group identifier exists on the new AMF.

722: The new AMF establishes a correspondence between the terminal and the group policy information.

723: The new AMF creates a group context.

During specific implementation, operation 723 may include: storing, by the new AMF, the group subscription information, the group policy information, and generated group access information in the group context. In this case, the group context may include the group subscription information, the group policy information, and the group access information.

For a method for generating the group access information, refer to the foregoing descriptions. Details are not described herein again.

724: The PCF subscribes to the event notification service for the terminal in the group from the new AMF.

For example, the PCF may subscribe to an event of the terminal in the group by invoking an event exposure subscription (Namf_EventExposure_Subscribe) service provided by the new AMF (that is, when some events related to the terminal in the group occur, the new AMF notifies the PCF of the event).

Operation 724 may be performed in a registration execution process of the first terminal that initiates registration to the new AMF, and may not be performed in a registration execution process of the second terminal or a terminal after the second terminal that initiates registration to the new AMF.

725: The new AMF updates/releases a session management context.

For example, the new AMF invokes a PDU session update/release session management context (Nsmf_PDUSession_UpdateSMContext/Nsmf_PDUSession_ReleaseSMContext) service provided by an SMF to update/release the session management context.

726: The new AMF establishes an NGAP UE association (an association between the terminal and a non-3GPP interworking function (N3IWF for short) entity).

For example, the new AMF interacts with the N3IWF entity to establish the NGAP UE association.

727: The N3IWF entity sends an NGAP UE association establishment response to the new AMF.

The NGAP UE association establishment response may include information about success or failure of establishment of the NGAP UE association.

728: The old AMF removes an association relationship between the PCF and the old AMF.

For example, the old AMF initiates policy association termination (AMF initiated policy association termination) to the PCF.

729: The new AMF sends a registration acceptance (registration accept) message to the terminal.

The registration acceptance message may include context information needed by the terminal.

The context information needed by the terminal may include information in the group context, or may include information in the private context of the terminal. For example, the context information needed by the terminal may include a 5G-GUTI of the terminal, registration area (registration area, RA for short) information, mobility restriction information, and the like.

730: The terminal sends a registration completion (registration complete) message to the new AMF.

In an embodiment, for operation 725 to operation 730, refer to operation 18 to operation 23 in section 4.2.2.2.2 in the communications protocol TS23.502-f10.

Embodiment 2

In this embodiment, a process of updating the group context in the foregoing embodiment is described by using an example.

Figure 8A:
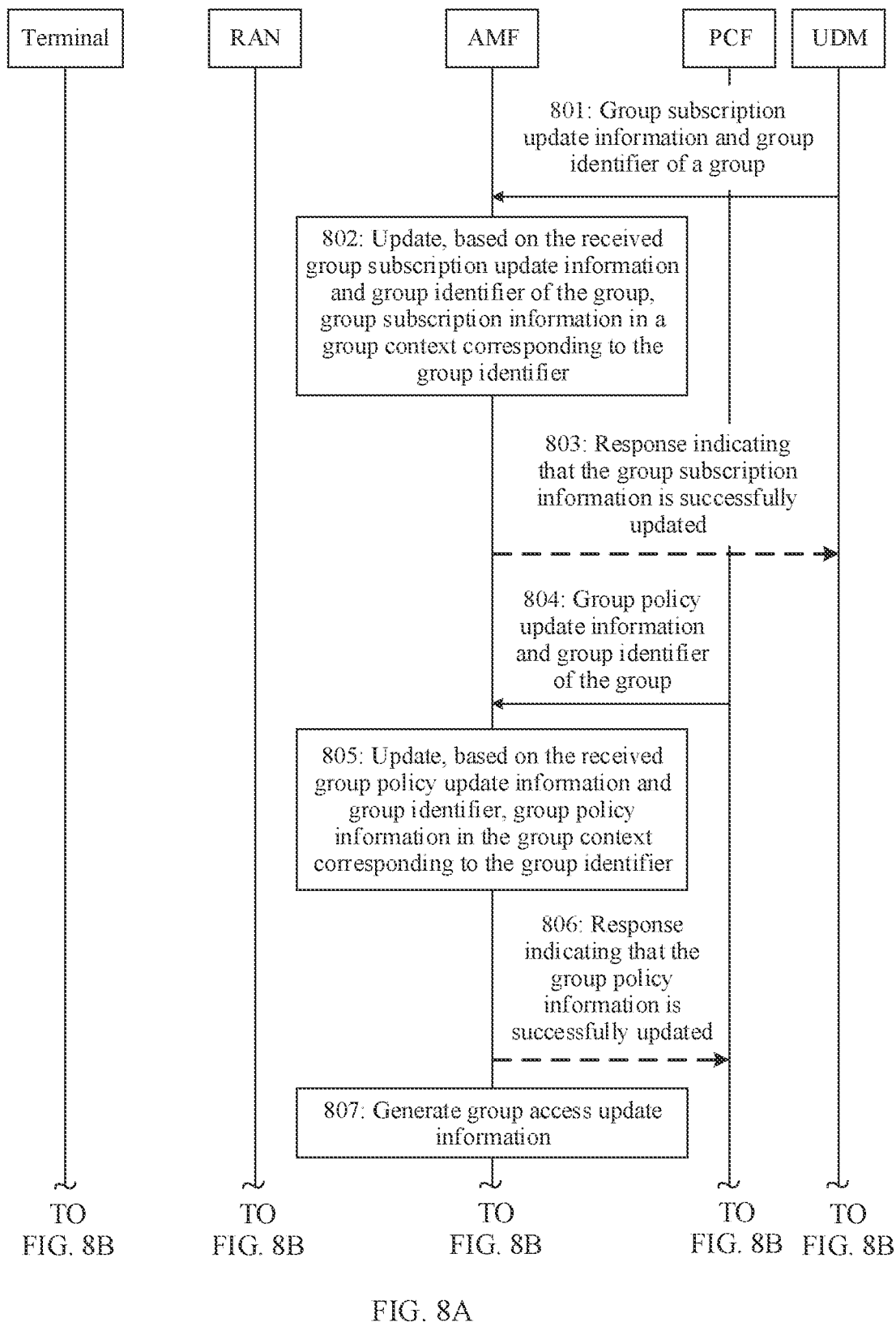
Figure 8B:
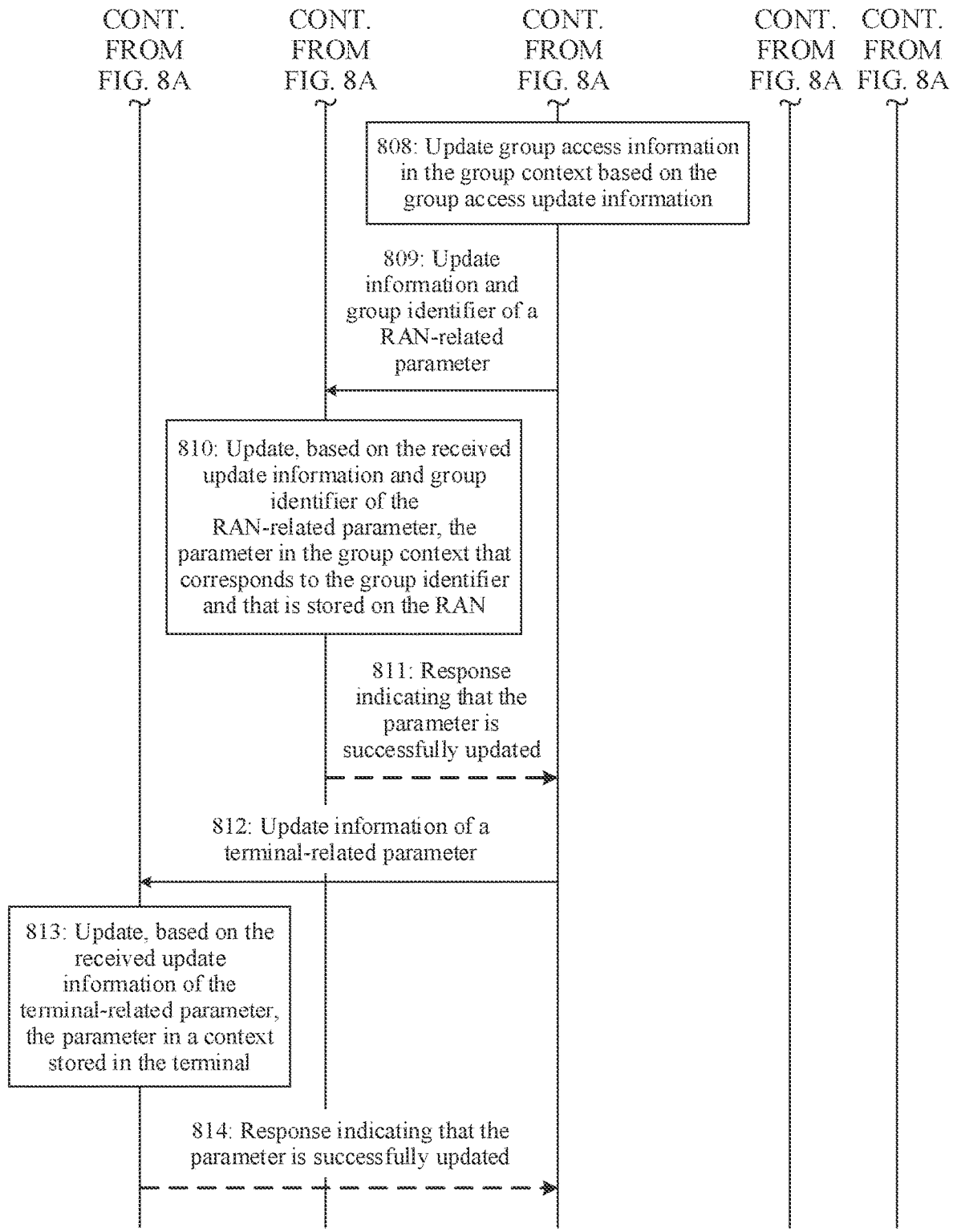

Referring to FIG. 8A and FIG. 8B, if group subscription information of a group in a UDM is updated, operation 801 to operation 803 or operation 801 to operation 802 are performed. If group policy information of a group in a PCF is updated, operation 804 to operation 806 or operation 804 to operation 805 are performed. If an AMF updates group access information in a group context, operation 807 to operation 808 are performed. If a RAN-related parameter in the group context stored on the AMF is updated, operation 809 to operation 811 or operation 809 to operation 810 are performed. If a terminal-related parameter in the group context stored on the AMF is updated, operation 812 to operation 814 or operation 812 to operation 813 are performed.

It may be understood that when a plurality of pieces of information in the group context are updated, corresponding operations of updating the plurality of pieces of information may be performed, and a sequence of performing these operations is not limited to a sequence of operations shown in FIG. 8A and FIG. 8B. For example, if the group policy information of the group in the PCF is updated, and the group subscription information of the group in the UDM is also updated, operation 801 to operation 806 may be performed. Operation 804 to operation 806 may be performed after operation 801 to operation 803, or may be performed before operation 801 to operation 803. Further, operation 806 and operation 803 may be performed in any sequence, and the sequence may be determined based on an actual scenario.

Referring to FIG. 8A and FIG. 8B, a method provided in Embodiment 2 includes the following operations.

801: The UDM sends group subscription update information and a group identifier of a group to the AMF.

For example, the UDM may send the group subscription update information and the group identifier of the group to the AMF by invoking a subscription data notification (Nudm_SDM_Notification) service provided by the UDM.

802: The AMF updates, based on the received group subscription update information and group identifier of the group, group subscription information in a group context corresponding to the group identifier.

803: The AMF sends, to the UDM, a response used to indicate that the group subscription information is successfully updated.

For example, the information used to indicate that the group subscription information is successfully updated may be included in a subscription data notification response (Nudm_SDM_Notification response) provided by the UDM.

Operation 803 is an optional operation.

804: The PCF sends group policy update information and the group identifier of the group to the AMF.

For example, the PCF may send the group policy update information and the group identifier to the AMF by invoking an access mobility policy control update notification (Npcf_AMPolicyControl_UpdateNotify) service provided by the PCF.

805: The AMF updates, based on the received group policy update information and group identifier, group policy information in the group context corresponding to the group identifier.

806: The AMF sends, to the PCF, a response used to indicate that the group policy information is successfully updated.

For example, the information used to indicate that the group policy information is successfully updated may be included in an access mobility policy control update notification response (Npcf_AMPolicyControl_UpdateNotify response) provided by the PCF.

Operation 806 is an optional operation.

807: The AMF generates group access update information.

808: The AMF updates the group access information in the group context based on the group access update information.

809: The AMF sends update information of the RAN-related parameter in the group context and the group identifier to a RAN.

For example, the AMF may carry the update information of the RAN-related parameter and the group identifier in a context modification request (for example, a UE context modification request) message, and send the UE context modification request message to the RAN.

The RAN-related parameter may be a group security parameter, a group paging parameter, a group QoS parameter, or a group MM parameter.

In addition, an update, for example, an update of the group security parameter, the group paging parameter, or the group MM parameter, of the RAN-related parameter may be performed by operation 807 to operation 808, that is, operation 809 to operation 810 may be performed after operation 807 to operation 808. The update, for example, an update of the group QoS parameter, of the RAN-related parameter may be performed by operation 804 to operation 805, that is, operation 809 to operation 810 may be performed after operation 804 to operation 805.

810: The RAN updates, based on the received update information of the RAN-related parameter and the received group identifier, the parameter in the group context that corresponds to the group identifier and that is stored on the RAN.

811: The RAN sends, to the AMF, a response used to indicate that the parameter is successfully updated.

For example, the information used to indicate that the parameter is successfully updated may be included in a terminal context modification response (UE context modification response).

Operation 811 is an optional operation.

812: The AMF sends update information of the terminal-related parameter to the terminal.

In an embodiment, the AMF may carry the update information of the terminal-related parameter to a terminal configuration update command (UE configuration update command) message and send the message to the terminal.

The terminal-related parameter may be a group key, a group DRX parameter, a group registration periodicity, and the like.

813: The terminal updates, based on the received update information of the terminal-related parameter, the parameter in the context stored on the terminal.

814: The terminal sends, to the AMF, a response used to indicate that the parameter is successfully updated.

Specifically, the information used to indicate that the parameter is successfully updated may be included in a terminal configuration update completion (UE configuration update complete) message.

Operation 814 is an optional operation.

It should be noted that the embodiment shown in FIG. 8A and FIG. 8B may be combined with the embodiment shown in FIG. 7A to FIG. 7D, for example, the embodiment shown in FIG. 8A and FIG. 8B is performed after operation 728. In this case, the AMF in the embodiment shown in FIG. 8A and FIG. 8B is the new AMF in the embodiment shown in FIG. 7A to FIG. 7D.

Embodiment 3

In this embodiment, a process of releasing the group context stored on the access network device in the foregoing embodiment is described by using an example. In this embodiment, a group context stored on an access network device may be released in an AN release procedure. The AN release procedure may include AN connection release and N3 user plane connection release between a RAN and a terminal. The AN connection release may be triggered by the RAN or an AMF. When the AN connection release is triggered by the AMF, operation 901 to operation 902 in FIG. 9 are not performed.

Figure 9:
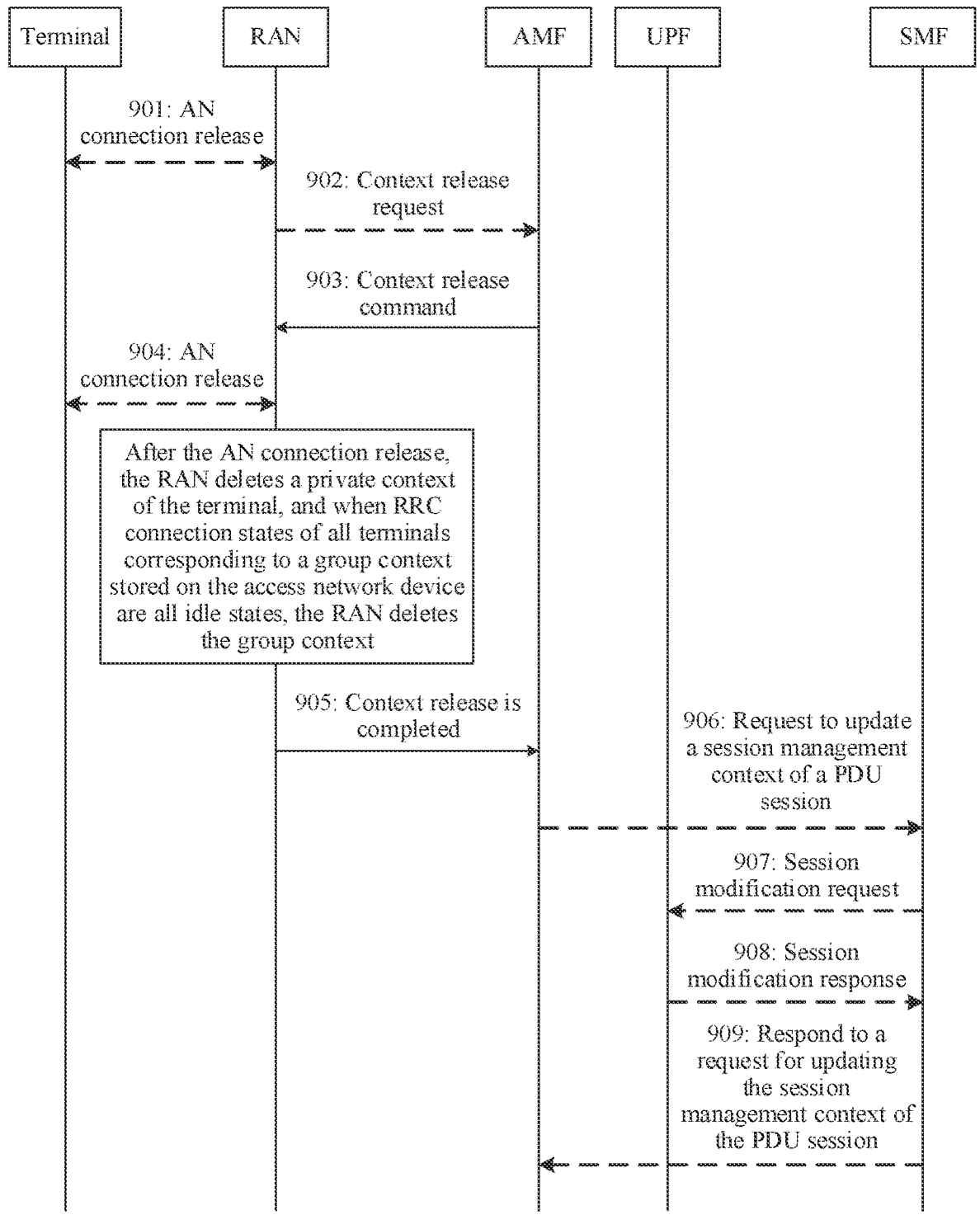

Referring to FIG. 9 (dashed-line operations in the figure are optional operations), the method provided in Embodiment 3 includes the following operations.

901: The RAN triggers AN connection release (AN connection release) between the RAN and the terminal.

If an AN connection is successfully released in operation 901, the RAN deletes a private context of the terminal. In addition, when RRC connection statuses of all terminals corresponding to a group context stored on the access network device are all idle states, the RAN deletes the group context.

902: The RAN sends a context release request (for example, N2 UE Context Release Request) message to the AMF.

A function of operation 902 is to request the AMF to release an N3 user plane connection.

903: The AMF sends a context release command (for example, N2 UE Context Release Command) to the RAN.

A function of operation 903 is to indicate a cause for releasing the RAN N3 user plane connection.

After the RAN receives the context release command, if it is determined that the AN connection is successfully released, operation 905 and operations after operation 905 are performed. If it is determined that the AN connection is not successfully released, operation 904 and operations after operation 904 are performed.

904: The AN connection release between the RAN and the terminal is performed.

After the AN connection release, the RAN deletes the private context of the terminal. In addition, when RRC connection statuses of all terminals corresponding to a group context stored on the access network device are all idle states, the RAN deletes the group context. FIG. 9 is drawn by using an example in which the process is performed after operation 904.

905: The RAN sends a context release completion (for example, N2 UE Context Release Complete) message to the AMF.

The context release completion message may be used by the AMF to determine that the N2 connection release is completed.

906: The AMF requests an SMF to update a session management context of a PDU session.

For example, the AMF invokes a PDU session update session management context request (Nsmf_PDUSession_UpdateSMContext Request) service provided by the SMF, to request to update the session management context of the PDU session.

907: The SMF sends a session modification request (for example, N4 Session Modification Request) message to the UPF.

908: The UPF sends a session modification response (for example, N4 Session Modification response) message to the SMF.

Operation 907 to operation 908 are used to release AN tunnel information on the UPF.

909: The SMF responds to the session management context request of the PDU session sent by the AMF.

For example, the SMF may respond to invoking of a PDU session update session management context service (Nsmf_PDUSession_UpdateSMContext Ack) provided by the SMF.

Operation 906 to operation 909 are used to release the N3 user plane connection.

The foregoing mainly describes the solutions provided in the embodiments of this application from a perspective of the method. It may be understood that, to implement the foregoing functions, the communications apparatus (the communications apparatus may be the first core network device or the second core network device in the foregoing description) includes a corresponding hardware structure and/or software module for performing each function. A person skilled in the art should easily be aware that, in combination with the examples described in the embodiments disclosed in this specification, units and algorithm operations may be implemented by hardware or a combination of hardware and computer software in this application. Whether a function is performed by hardware or hardware driven by computer software depends on particular applications and design constraints of the technical solutions. A person skilled in the art may use different methods to implement the described functions for particular applications, but it should not be considered that the implementation goes beyond the scope of this application.

In an embodiment of this application, the communications apparatus may be divided into function modules based on the foregoing method examples. For example, each function module may be obtained through division based on each corresponding function, or two or more functions may be integrated into one processing module. The foregoing integrated module may be implemented in a form of hardware, or may be implemented in a form of a software function module. It should be noted that, in the embodiments of this application, division into modules is merely an example, and is merely a logical function division. In actual implementation, another division manner may be used.

Figure 10:
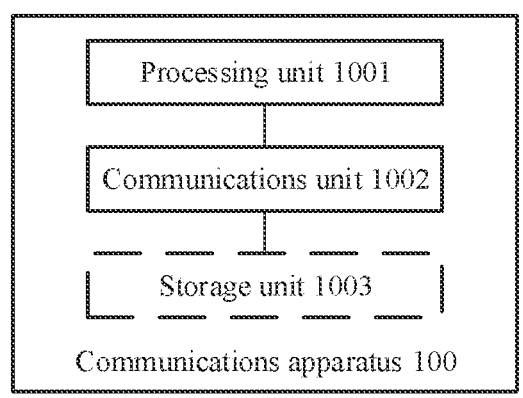
FIG. 10 is a schematic composition diagram of a communications apparatus according to an embodiment of this application.

Referring to FIG. 10, an embodiment of this application provides a communications apparatus. The communications apparatus 100 may be configured to perform actions of a first core network device in the foregoing method embodiments. The communications apparatus 100 may be the first core network device, or may be a chip or a system on chip. This is not limited. Specifically, the communications apparatus 100 may include a processing unit 1001 and a communications unit 1002. In an embodiment, the communications apparatus 100 may further include a storage unit 1003, configured to store program code and data of the first core network device. In an embodiment, the processing unit 1001 is configured to: when group information corresponding to a terminal has been stored, establish a correspondence between the terminal and the group information.

In an embodiment, the group information includes group subscription information, group policy information, or group access information.

In an embodiment, the processing unit 1001 is further configured to: obtain a group identifier of a group to which the terminal belongs; and determine, based on the group identifier, that the apparatus has stored the group information corresponding to the terminal.

In an embodiment, the processing unit 1001 is further configured to: obtain an identifier of the terminal; and determine, based on the identifier of the terminal, that the apparatus has stored the group information corresponding to the terminal.

In an embodiment, the group access information is obtained based on the group policy information and the group subscription information.

In an embodiment, the processing unit 1001 is further configured to update the group information.

In an embodiment, the apparatus further includes a communications unit 1002, and the processing unit 1001 is configured to: when the group information is the group policy information or the group subscription information, receive, through the communications unit 1002, update information of the group information, and update the group information based on the update information of the group information; or when the group information is the group access information, generate update information of the group information, and update the group information based on the update information of the group information.

In an embodiment, the communications unit 1002 is configured to: when an access network device accessed by the terminal does not store a first parameter in the group information, send an identifier of the terminal and the first parameter to the access network device, where the first parameter is a group security parameter, a group paging parameter, a group QoS parameter, or a group MM parameter.

In an embodiment, the communications unit 1002 is configured to: when the access network device accessed by the terminal has stored a second parameter in the group information, send the identifier of the terminal to the access network device, where the second parameter is a group security parameter, a group paging parameter, a group QoS parameter, or a group MM parameter.

In an embodiment, the communications unit 1002 is configured to send update information of a third parameter in the group information to the access network device, where the third parameter is a group security parameter, a group paging parameter, a group QoS parameter, or a group MM parameter.

In another embodiment, the processing unit 1001 is configured to: when the apparatus does not store group information corresponding to a terminal, obtain the group information; and the processing unit 1001 is further configured to create a group context based on the group information, where the group context includes the group information.

In an embodiment, the group information includes group subscription information, group policy information, or group access information.

In an embodiment, the processing unit 1001 is further configured to: obtain a group identifier of a group to which the terminal belongs; and determine, based on the group identifier, that the apparatus does not store the group information corresponding to the terminal.

In an embodiment, the processing unit 1001 is further configured to: obtain an identifier of the terminal; and determine, based on the identifier of the terminal, that the apparatus does not store the group information corresponding to the terminal.

In an embodiment, the apparatus further includes a communications unit 1002, and the processing unit 1001 is configured to: when the group information is the group policy information, receive, through the communications unit 1002, the group policy information from a second core network device; or when the group information is the group subscription information, receive, through the communications unit 1002, the group subscription information from a third core network device; or when the group information is the group access information, generate the group access information.

In an embodiment, the processing unit 1001 is configured to store the group information in a group context.

In an embodiment, the group access information is obtained based on the group policy information and the group subscription information.

In an embodiment, the processing unit 1001 is further configured to update the group information.

In an embodiment, the processing unit 1001 is configured to: when the group information is the group policy information or the group subscription information, receive, through the communications unit 1002, update information of the group information, and update the group information based on the update information of the group information; or when the group information is the group access information, generate update information of the group information, and update the group information based on the update information of the group information.

In an embodiment, the communications unit 1002 is configured to: when an access network device accessed by the terminal does not store a first parameter in the group information, send an identifier of the terminal and the first parameter to the access network device, where the first parameter is a group security parameter, a group paging parameter, a group QoS parameter, or a group MM parameter.

In an embodiment, the communications unit 1002 is configured to: when the access network device accessed by the terminal has stored a second parameter in the group information, send the identifier of the terminal to the access network device, where the second parameter is a group security parameter, a group paging parameter, a group QoS parameter, or a group MM parameter.

In an embodiment, the communications unit 1002 is configured to send update information of a third parameter in the group information to the access network device, where the third parameter is a group security parameter, a group paging parameter, a group QoS parameter, or a group MM parameter.

Referring to FIG. 10, an embodiment of this application provides a communications apparatus. The communications apparatus 100 may be configured to perform actions of a second core network device in the foregoing method embodiments. The communications apparatus 100 may be the second core network device, or may be a chip or a system on chip. This is not limited. Specifically, the communications apparatus 100 may include a processing unit 1001 and a communications unit 1002. Optionally, the apparatus 100 may further include a storage unit 1003, configured to store program code and data of the second core network device.

The processing unit 1001 is configured to send, through the communications unit 1002, group policy information corresponding to a terminal to a first core network device.

In an embodiment, if the group policy information in the apparatus is updated, the processing unit 1001 is further configured to send, through the communications unit 1002, updated group policy information to the first core network device.

The processing unit 1001 may be a processor or a controller. The processing unit 1002 may be a communications interface, a transceiver, a transceiver circuit, or the like. The communications interface is a general term, and may include one or more interfaces. The storage unit 1003 may be a memory.

When the processing unit 1001 is a processor, the processing unit 1002 is a communications interface, and the storage unit 1003 is a memory, the communications apparatus in this embodiment of this application may be the communications apparatus shown in FIG. 2.

An embodiment of this application further provides a computer-readable storage medium, including an instruction. When the instruction is run on a computer, the computer is enabled to perform actions of the first core network device, the second core network device, the third core network device, the access network device, or the terminal in the foregoing method embodiments.

An embodiment of this application further provides a computer program product including an instruction. When the computer program product is run on a computer, the computer is enabled to perform actions of the first core network device, the second core network device, the third core network device, the access network device, or the terminal in the foregoing method embodiments.

An embodiment of this application further provides a communications system, including the first core network device and the second core network device in the foregoing embodiments.

In an embodiment, the system further includes one or more of the third core network device, the fourth core network device, the access network device, and the terminal.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims and their equivalent technologies of the claims of this application.

What is claimed is:

1. A context management apparatus operating as a first core network device, comprising:
   a memory storing program code; and
   a processor in communication with the memory, the processor executing the program code to perform:
   in response to determining that the first core network device does not store group information corresponding to a first terminal, obtaining the group information corresponding to the first terminal, wherein the group information comprises group subscription information, group policy information, or group access information; and
   creating a group context of a group based on the obtained group information, wherein the group context comprises the group information, wherein the group is a group of terminals to which the first terminal belongs.

2. The apparatus according to claim 1, wherein the processor is further configured to:
   obtain a group identifier of the group; and
   determine, based on the group identifier, that the first core network device does not store the group information corresponding to the first terminal.

3. The apparatus according to claim 1, wherein the processor is further configured to:
   obtain an identifier of the first terminal; and
   determine, based on the identifier of the first terminal, that the first core network device does not store the group information corresponding to the first terminal.

4. The apparatus according to claim 1, wherein the processor is further configured to:
   when the group information is the group policy information, receive the group policy information from a second core network device; or
   when the group information is the group subscription information, receive the group subscription information from a third core network device; or
   when the group information is the group access information, generate the group access information.

5. The apparatus according to claim 1, wherein the processor is further configured to:
   store the group information in the group context.

6. The apparatus according to claim 1, wherein the processor is further configured to:
   in response to determining that the first core network device has stored group information corresponding to a second terminal, establish a correspondence between the second terminal and the group information, wherein the second terminal belongs to the group.

7. The apparatus according to claim 6, wherein the correspondence is a mapping relationship.

8. A non-transitory computer readable storage medium comprising instructions which, when executed by one or more processors, cause a first core network device to perform operations comprising:
   in response to determining that the first core network device does not store group information corresponding to a first terminal, obtaining the group information corresponding to the first terminal, wherein the group information comprises group subscription information, group policy information, or group access information; and
   creating a group context of a group based on the obtained group information, wherein the group context comprises the group information, wherein the group is a group of terminals to which the first terminal belongs.

9. The non-transitory computer readable storage medium according to claim 8, wherein the computer instructions further cause the first core network device to:
   obtain a group identifier of the group; and
   determine, based on the group identifier, that the first core network device does not store the group information corresponding to the first terminal.

10. The non-transitory computer readable storage medium according to claim 8, wherein the computer instructions further cause the first core network device to:
    obtain an identifier of the first terminal; and
    determine, based on the identifier of the first terminal, that the first core network device does not store the group information corresponding to the first terminal.

11. The non-transitory computer readable storage medium according to claim 8, wherein the computer instructions further cause the first core network device to:
    when the group information is the group policy information, receive the group policy information from a second core network device; or
    when the group information is the group subscription information, receive the group subscription information from a third core network device; or
    when the group information is the group access information, generate the group access information.

12. The non-transitory computer readable storage medium according to claim 8, wherein the computer instructions further cause the first core network device to:
    store the group information in the group context.

13. The non-transitory computer readable storage medium according to claim 8, wherein the computer instructions further cause the first core network device to:
    in response to determining that the first core network device has stored group information corresponding to a second terminal, establish a correspondence between the second terminal and the group information, wherein the second terminal belongs to the group.

14. A context management system, comprising:
    a first core network device, and a second core network device; wherein the first core network device is configured to:
    in response to determining that the first core network device does not store group information corresponding to a first terminal, obtain the group information corresponding to the first terminal, wherein the group information comprises group subscription information, group policy information, or group access information; and
    create a group context of a group based on the obtained group information, wherein the group context comprises the group information, wherein the group is a group of terminals to which the first terminal belongs.

15. The system according to claim 14, wherein the second core network device is configured to:
    send the group policy information or the group subscription information to the first core network device.

16. The system according to claim 14, wherein the first core network device is further configured to:
    obtain a group identifier of the group; and
    determine, based on the group identifier, that the first core network device does not store the group information corresponding to the first terminal.

17. The system according to claim 14, wherein the first core network device is further configured to:
    obtain an identifier of the first terminal; and
    determine, based on the identifier of the first terminal, that the first core network device does not store the group information corresponding to the first terminal.

18. The system according to claim 14, wherein the first core network device is further configured to store the group information in the group context.

19. The system according to claim 14, wherein the first core network device is further configured to:
    in response to determining that the first core network device has stored group information corresponding to a second terminal, establish a correspondence between the second terminal and the group information, wherein the second terminal belongs to the group.

20. The system according to claim 19, wherein the correspondence is a mapping relationship.

* * * * *